(12) United States Patent
Li

(10) Patent No.: US 10,713,074 B2
(45) Date of Patent: Jul. 14, 2020

(54) METHOD, APPARATUS, AND SYSTEM FOR ACCESSING STORAGE DEVICE

(71) Applicant: Huawei Technologies Co., Ltd., Shenzhen (CN)

(72) Inventor: Langbo Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 15/666,306

(22) Filed: Aug. 1, 2017

(65) Prior Publication Data

US 2017/0329625 A1 Nov. 16, 2017

Related U.S. Application Data

(63) Continuation of application No. PCT/CN2015/092457, filed on Oct. 21, 2015.

(51) Int. Cl.
*G06F 9/455* (2018.01)
*G06F 12/1009* (2016.01)
*G06F 12/109* (2016.01)

(52) U.S. Cl.
CPC ...... *G06F 9/45558* (2013.01); *G06F 12/1009* (2013.01); *G06F 12/109* (2013.01); *G06F 2009/45579* (2013.01); *G06F 2009/45583* (2013.01); *G06F 2212/657* (2013.01)

(58) Field of Classification Search
CPC ............... G06F 12/1009; G06F 12/109; G06F 12/1036; G06F 9/4558; G06F 2212/657; G06F 2009/45579; G06F 2009/45583
See application file for complete search history.

(56) References Cited

U.S. PATENT DOCUMENTS

| | | | | | |
|---|---|---|---|---|---|
| 5,890,220 | A | * | 3/1999 | Mochida | G06F 12/1081 710/26 |
| 5,996,026 | A | * | 11/1999 | Onodera | G06F 13/122 707/999.001 |
| 7,689,800 | B2 | * | 3/2010 | Oshins | G06F 9/45537 711/173 |
| 9,052,835 | B1 | * | 6/2015 | Darrington | G06F 3/0659 |
| 2005/0080982 | A1 | | 4/2005 | Vasilevsky et al. | |

(Continued)

FOREIGN PATENT DOCUMENTS

CN 102207886 A 10/2011
CN 102426557 A 4/2012

(Continued)

*Primary Examiner* — Michael Krofcheck
(74) *Attorney, Agent, or Firm* — Leydig, Voit & Mayer, Ltd.

(57) ABSTRACT

A method, an apparatus, and a system for accessing a storage device. The method includes: acquiring, by an I/O adapter, an access request from a virtual machine, where the access request carries virtual address information of a to-be-accessed storage area; generating an access instruction according to the access request, where the access instruction carries the virtual address information and an identifier of a virtual channel of the virtual machine, where the virtual channel corresponds to the virtual machine on a one-to-one basis and is used to connect the corresponding virtual machine to a storage device target, and the storage device target is configured to manage access to the storage device; and sending the access instruction to the storage device target.

25 Claims, 8 Drawing Sheets

(56) References Cited

U.S. PATENT DOCUMENTS

| | | | |
|---|---|---|---|
| 2008/0046610 A1* | 2/2008 | Tripathi | G06F 9/45558 |
| | | | 710/36 |
| 2011/0078682 A1* | 3/2011 | Doan | G06F 9/45537 |
| | | | 718/1 |
| 2011/0154318 A1 | 6/2011 | Oshins et al. | |
| 2011/0246171 A1 | 10/2011 | Cleeton et al. | |
| 2013/0152086 A1 | 6/2013 | Yoo et al. | |
| 2016/0004438 A1* | 1/2016 | Moon | G06F 3/061 |
| | | | 711/103 |
| 2016/0306580 A1* | 10/2016 | Pinto | G06F 13/4282 |

FOREIGN PATENT DOCUMENTS

| | | |
|---|---|---|
| CN | 102662869 A | 9/2012 |
| CN | 103793330 A | 5/2014 |

\* cited by examiner

METHOD, APPARATUS, AND SYSTEM FOR ACCESSING STORAGE DEVICE

CROSS-REFERENCE TO RELATED APPLICATIONS

This application is a continuation of International Application No. PCT/CN2015/092457, filed on Oct. 21, 2015, the disclosure of which is hereby incorporated by reference in its entirety.

TECHNICAL FIELD

Embodiments of the present disclosure relate to the computer field, and in particular, to a method, an apparatus, and a system for accessing a storage device.

BACKGROUND

A virtualization technology is originated from a requirement for a time-sharing system. A main objective of virtualization technology is to run a plurality of operating systems on one host, such that expensive computing resources on a mainframe server are fully used. As performance of an x86 processor is enhanced and applications of the x86 processor are popularized, development of the virtualization technology also begins to develop into the x86 architecture. In particular, at the end of 1990 s, virtualization software vendors broke a new path for applying the virtualization technology on an x86 platform, and provides a software solution centered on a virtual machine monitor (VMM) to virtualize a personal computer (PC) server platform. Virtual machines (VM) are used to create a plurality of independent virtual hardware systems that have a same instruction set architecture (ISA) as physical hardware, where different operating systems, that is, guest operating systems (Guest OS), can run in each virtual hardware system. A guest operating system accesses a physical resource using the VMM.

In the prior art, access to a peripheral by a virtual machine requires conversion operations at a plurality of software layers, and access to a storage device is redundant because of the mechanism. Therefore, a new technology needs to be developed to resolve this problem.

SUMMARY

In view of this, embodiments of the present disclosure provide a method, an apparatus, and a system for accessing a storage device, so as to simplify access to the storage device by a virtual machine.

According to a first aspect, an embodiment of the present disclosure provides a method for accessing a storage device. An I/O adapter is configured in a computer system to manage access to the storage device by a virtual machine running in the computer system. After acquiring, from the virtual machine, an access request that carries virtual address information of a storage area to be accessed by the virtual machine, the I/O adapter generates an access instruction according to the access request, and sends the access instruction to a storage device target. The access instruction carries the virtual address information and an identifier of a virtual channel of the virtual machine, where the virtual channel is used to connect the virtual machine to the storage device target, the virtual machine corresponds to the virtual channel on a one-to-one basis, and the storage device target is configured to manage access to the storage device.

The virtual machine corresponds to the virtual channel on a one-to-one basis. The virtual channel refers to a data transmission channel that is established on a physical link in a data transmission process using storage and transmission protocols and indicates a unique connection relationship between the virtual machine and the storage device. The virtual channel and the identifier of the virtual channel are used to represent a unique connection relationship between the virtual machine and the storage device (storage device target). Each virtual machine is connected to the storage device (storage device target) using a unique virtual channel identified by a virtual channel identifier. In specific implementation, the virtual channel may be implemented in a plurality of forms, for example, may be implemented as a time division multiplexing physical connection channel.

The I/O adapter maintains the virtual channel between the virtual machine and the storage device, and the identifier of the virtual channel corresponding to the virtual machine is added to the access instruction. Therefore, access to the storage device by the virtual machine is implemented, and an access process is simplified.

It should be understood that, in this application, a virtual channel corresponds to a virtual machine on a one-to-one basis; an entity corresponds to a virtual channel on a one-to-one basis, and therefore corresponds to a virtual machine on a one-to-one basis. In some descriptions of this application, "corresponding to a virtual machine" and "corresponding to a virtual channel" are interchangeable, and "associated with a virtual machine" and "associated with a virtual channel" are also interchangeable.

With reference to the first aspect, in a first possible implementation manner of the first aspect, before generating the access instruction according to the access request, the I/O adapter queries a preset first correspondence, so as to determine the identifier of the virtual channel corresponding to the virtual machine, where the preset first correspondence includes a correspondence between an identifier of each virtual machine and an identifier of each virtual channel, and the first correspondence may be configured in advance, or determined by the I/O adapter through negotiation with the storage device target. The correspondence is implemented in a variety of forms, for example, may be represented in a form of a data table; or a register may be configured for each virtual machine, and the correspondence is represented by an identifier of a corresponding virtual channel stored in the register. A specific implementation form of the correspondence is not limited in this application.

With reference to the first aspect or any one of the foregoing possible implementation manners of the first aspect, in a second possible implementation manner of the first aspect, at least one cache queue is configured in the I/O adapter, and each cache queue corresponds to a respective virtual channel on a one-to-one basis; after acquiring the access request from the virtual machine, if the I/O adapter is currently not in an idle state or has heavy load, the I/O adapter may further write the access request in a first cache queue corresponding to the virtual channel of the virtual machine, and before generating the access instruction according to the access request, fetch the access request from the first cache queue corresponding to the virtual channel of the virtual machine.

Adding a cache queue for each virtual channel may allow the I/O adapter to work more flexibly without losing any access request in a case of heavy load. Using a cache queue whose structure is similar to a first in first out (FIFO) structure to cache access requests of all virtual machines is also an optional implementation manner. However, the FIFO structure cannot distinguish between priorities of the virtual machines or the like. A cache queue may be configured for each virtual channel, such that combination processing may be further performed on access requests that can be combined.

With reference to the first aspect or any one of the foregoing possible implementation manners of the first aspect, in a third possible implementation manner of the first aspect, if the I/O adapter acquires at least two access requests from at least two virtual machines, that the I/O adapter generates an access instruction according to the access request includes: first generating, by the I/O adapter according to priorities of the at least two virtual machines corresponding to the at least two access requests and according to priorities, an access instruction corresponding to a high-priority virtual machine, and then generating an access instruction corresponding to a low-priority virtual machine.

Priorities are set for different virtual machines, such that access by important virtual machines or those with high priorities may be preferentially processed. Therefore, the virtual machine can access the storage device more flexibly.

With reference to the first aspect or any one of the foregoing possible implementation manners of the first aspect, in a fourth possible implementation manner of the first aspect, if the I/O adapter acquires at least two access requests from at least two virtual machines, that the I/O adapter generates an access instruction according to the access request includes: first generating, by the I/O adapter according to a time sequence of acquiring the at least two access requests, an access instruction corresponding to an earlier received access request, and then generating an access instruction corresponding to a later received access request.

Because processing is performed according to the sequence of receiving the access requests, a system architecture may be simplified. Only a FIFO cache structure needs to be used, and access requests of different virtual machines do not need to be separately cached.

With reference to the first aspect or any one of the foregoing possible implementation manners of the first aspect, in a fifth possible implementation manner of the first aspect, after sending the access instruction to the storage device target, the I/O adapter further acquires a feedback message from the storage device target, where the feedback message includes an execution result of the access instruction and the identifier of the virtual channel of the virtual machine; and the I/O adapter determines the virtual machine according to the identifier of the virtual channel, and sends the execution result of the access instruction to the virtual machine.

With reference to the first aspect or any one of the foregoing possible implementation manners of the first aspect, in a sixth possible implementation manner of the first aspect, that the I/O adapter acquires an access request from the virtual machine includes: receiving, by the I/O adapter, a first doorbell notification from the virtual machine, and acquiring the access request from an I/O shared ring that is shared with the virtual machine, where the access request is write in the I/O shared ring by the virtual machine, and the first doorbell notification is used to indicate arrival of the access request at the I/O shared ring; and that the I/O adapter sends the execution result of the access instruction to the virtual machine includes: writing, by the I/O adapter, the execution result of the access instruction in the I/O shared ring that is shared with the virtual machine, and sending a second doorbell notification to the virtual machine, where the second doorbell notification is used to indicate arrival of the execution result at the I/O shared ring.

With reference to the first aspect or any one of the foregoing possible implementation manners of the first aspect, in a seventh possible implementation manner of the first aspect, the virtual machine runs on a computing device that is independent of the storage device, and the access instruction is a small computer system interface (SCSI) instruction that can be processed by a host bus adapter driver layer; and that the I/O adapter sends the access instruction to a storage device target includes: sending, by the I/O adapter, the access instruction to the storage device target using the host bus adapter driver layer.

If the virtual machine runs on the storage device, that is, in an application scenario of an all-in-one machine, the I/O adapter and the storage device target may transmit messages such as access instructions without using the host bus adapter (HBA) driver layer.

According to a second aspect, an embodiment of the present disclosure provides a computer-readable medium, including a computer executable instruction, where when a processor of a computer executes the computer executable instruction, the computer executes the method according to the first aspect or any possible implementation manner of the first aspect.

According to a third aspect, an embodiment of the present disclosure provides an apparatus for accessing a storage device, where the apparatus includes a processor, a memory, a bus, and a communications interface; the memory is configured to store an executable instruction; the processor is connected to the memory using the bus; and when the apparatus for accessing a storage device runs, the processor executes the executable instruction stored in the memory, such that the apparatus executes the method according to the first aspect or any possible implementation manner of the first aspect.

According to a fourth aspect, an embodiment of the present disclosure provides a method for accessing a storage device. The method is used to manage access to the storage device by a virtual machine and includes: acquiring, by a storage device target, an access instruction, where the access instruction carries virtual address information and an identifier of a virtual channel of the virtual machine, where the virtual channel is used to connect the virtual machine to the storage device target, the virtual machine corresponds to the virtual channel on a one-to-one basis, and the virtual address information is used to indicate a virtual address of a to-be-accessed storage area in the virtual machine; determining, by the storage device target, a physical address of the to-be-accessed storage area in the storage device according to the virtual address information and the identifier of the virtual channel of the virtual machine that are carried in the access instruction; and performing, by the storage device target, an operation on the to-be-accessed storage area according to the access instruction and the physical address of the to-be-accessed storage area in the storage device.

Configuring virtual channels may allow the storage device target to identify different virtual machines. Because the virtual channel represents a unique connection relationship between the virtual machine and the storage device, even if identifiers of virtual machines running on different physical machines are repeated, the storage device can also distinguish between the virtual machines on different physical machines, and thereby uniquely determine, according to the virtual address information and the identifier of the virtual channel of the virtual machine, the physical address of the storage area to be accessed by the virtual machine.

With reference to the fourth aspect, in a first possible implementation manner of the fourth aspect, the determining, by the storage device target, a physical address of the to-be-accessed storage area in the storage device according to the virtual address information and the identifier of the virtual channel of the virtual machine that are carried in the access instruction, includes: querying, by the storage device target, a preset second correspondence according to the virtual address information and the identifier of the virtual channel of the virtual machine that are carried in the access instruction, and determining the physical address of the to-be-accessed storage area in the storage device, where the preset second correspondence includes a correspondence between an identifier of each virtual channel and a physical address of a storage area allocated to each virtual channel.

Herein, the second correspondence is implemented in a variety of forms, and may be represented in a form of a data table; or a register may be configured for each virtual machine, and the correspondence is represented by an identifier of a corresponding virtual channel stored in the register. A specific implementation form of the correspondence is not limited in this application.

With reference to the fourth aspect or any one of the foregoing possible implementation manners of the fourth aspect, in a second possible implementation manner of the fourth aspect, at least one cache queue is configured in the storage device target, and each cache queue corresponds to a respective virtual channel on a one-to-one basis; after the acquiring, by a storage device target, an access instruction, the method further includes: writing, by the storage device target, the access instruction in a second cache queue corresponding to the virtual channel of the virtual machine; and before the storage device target determines the physical address of the to-be-accessed storage area in the storage device, the method further includes: fetching, by the storage device target, the access instruction from the second cache queue corresponding to the virtual channel of the virtual machine.

Configuring a corresponding cache queue for each virtual channel may allow the storage device target to work in a more flexible manner and take pertinent actions in a case of an access burst of some virtual machines. In addition, access requests of some virtual machines may be preferentially processed according to requirements, and combination processing may be further performed on access requests that can be combined.

Optionally, the cache queue of the storage device target may also use a FIFO structure.

With reference to the fourth aspect or any one of the foregoing possible implementation manners of the fourth aspect, in a third possible implementation manner of the fourth aspect, if the storage device target acquires at least two access instructions from at least two virtual machines, the determining, by the storage device target, a physical address of the to-be-accessed storage area in the storage device, includes: first determining, by the storage device target according to priorities of the at least two virtual machines corresponding to the at least two access instructions and according to priorities, a physical address of a storage area to be accessed by a high-priority virtual machine in the storage device, and then determining a physical address of a storage area to be accessed by a low-priority virtual machine in the storage device.

Priorities are set for different virtual channels (virtual machines), such that the storage device target can process access requests of important virtual machines or those with high priorities preferentially. Therefore, the storage device target manages access to the storage device more flexibly. The priorities may be adjusted dynamically.

With reference to the fourth aspect or any one of the foregoing possible implementation manners of the fourth aspect, if the storage device target acquires at least two access instructions from at least two virtual machines, the determining, by the storage device target, a physical address of the to-be-accessed storage area in the storage device, includes: first determining, by the storage device target according to a time sequence of acquiring the at least two access instructions, a physical address of a to-be-accessed storage area corresponding to an earlier received access instruction in the storage device, and then determining a physical address of a to-be-accessed storage area corresponding to a later received access instruction in the storage device.

The access instructions are processed according to the time sequence of receiving the access instructions. Therefore, a system architecture of the storage device may be simplified, and a requirement may be satisfied by merely using a FIFO cache structure.

With reference to the fourth aspect or any one of the foregoing possible implementation manners of the fourth aspect, in a fifth possible implementation manner of the fourth aspect, after the performing, by the storage device target, an operation on the to-be-accessed storage area according to the access instruction and the physical address of the to-be-accessed storage area in the storage device, the method further includes: returning, by the storage device target, a feedback message, where the feedback message includes an execution result of the access instruction and the identifier of the virtual channel of the virtual machine.

According to a fifth aspect, an embodiment of the present disclosure provides a computer-readable medium, including a computer executable instruction, where when a processor of a computer executes the computer executable instruction, the computer executes the method according to the fourth aspect or any possible implementation manner of the fourth aspect.

According to a sixth aspect, an embodiment of the present disclosure provides an apparatus for accessing a storage device, where the apparatus includes a processor, a memory, a bus, and a communications interface; the memory is configured to store an executable instruction; the processor is connected to the memory using the bus; and when the apparatus for accessing a storage device runs, the processor executes the executable instruction stored in the memory, such that the apparatus executes the method according to the fourth aspect or any possible implementation manner of the fourth aspect.

According to a seventh aspect, an embodiment of the present disclosure provides an apparatus for accessing a storage device, where the apparatus is configured to manage access to the storage device by a virtual machine running in a computer system and includes: an acquiring unit, configured to acquire an access request from the virtual machine, where the access request carries virtual address information of a to-be-accessed storage area; a generation unit, configured to generate an access instruction according to the access request, where the access instruction carries the virtual address information and an identifier of a virtual channel of the virtual machine, where the virtual channel is used to connect the virtual machine to a storage device target, the virtual machine corresponds to the virtual channel on a one-to-one basis, and the storage device target is configured to manage access to the storage device; and a sending unit, configured to send the access instruction to the storage device target.

With reference to the seventh aspect, in a first possible implementation manner of the seventh aspect, before generating the access instruction according to the access request, the generation unit is further configured to query a preset first correspondence according to an identifier of the virtual machine, so as to determine the identifier of the virtual channel, where the preset first correspondence includes a correspondence between an identifier of each virtual machine and an identifier of each virtual channel.

With reference to the seventh aspect or any one of the foregoing possible implementation manners of the seventh aspect, in a second possible implementation manner of the seventh aspect, at least one cache queue is configured in the apparatus, and each cache queue corresponds to a respective virtual channel on a one-to-one basis; after acquiring the access request from the virtual machine, the acquiring unit is further configured to write the access request in a first cache queue corresponding to the virtual channel of the virtual machine; and before generating the access instruction according to the access request, the generation unit is further configured to fetch the access request from the first cache queue corresponding to the virtual channel of the virtual machine.

With reference to the seventh aspect or any one of the foregoing possible implementation manners of the seventh aspect, in a third possible implementation manner of the seventh aspect, if the acquiring unit acquires at least two access requests from at least two virtual machines, that the generation unit is configured to generate an access instruction according to the access request includes: the generation unit is configured to first generate, according to priorities of the at least two virtual machines corresponding to the at least two access requests and according to priorities, an access instruction corresponding to a high-priority virtual machine, and then generate an access instruction corresponding to a low-priority virtual machine.

With reference to the seventh aspect or any one of the foregoing possible implementation manners of the seventh aspect, in a fourth possible implementation manner of the seventh aspect, if the acquiring unit acquires at least two access requests from at least two virtual machines, that the generation unit is configured to generate an access instruction according to the access request includes: the generation unit is configured to first generate, according to a time sequence of acquiring the at least two access requests, an access instruction corresponding to an earlier received access request, and then generate an access instruction corresponding to a later received access request.

With reference to the seventh aspect or any one of the foregoing possible implementation manners of the seventh aspect, in a fifth possible implementation manner of the seventh aspect, after the sending unit sends the access instruction to the storage device target, the acquiring unit is further configured to acquire a feedback message from the storage device target, where the feedback message includes an execution result of the access instruction and the identifier of the virtual channel of the virtual machine; and the sending unit is further configured to determine the virtual machine according to the identifier of the virtual channel, and send the execution result of the access instruction to the virtual machine.

With reference to the seventh aspect or any one of the foregoing possible implementation manners of the seventh aspect, in a sixth possible implementation manner of the seventh aspect, that the acquiring unit is configured to acquire an access request from the virtual machine includes: the acquiring unit is configured to receive a first doorbell notification from the virtual machine, and acquire the access request from an I/O shared ring that is shared with the virtual machine, where the access request is write in the I/O shared ring by the virtual machine, and the first doorbell notification is used to indicate arrival of the access request at the I/O shared ring; and that the sending unit is configured to send the execution result of the access instruction to the virtual machine includes: the sending unit is configured to write the execution result of the access instruction in the I/O shared ring that is shared with the virtual machine, and send a second doorbell notification to the virtual machine, where the second doorbell notification is used to indicate arrival of the execution result at the I/O shared ring.

With reference to the seventh aspect or any one of the foregoing possible implementation manners of the seventh aspect, in a seventh possible implementation manner of the seventh aspect, the access instruction is a small computer system interface (SCSI) instruction that can be processed by a host bus adapter driver layer; and that the sending unit is configured to send the access instruction to the storage device target includes: the sending unit is configured to send the access instruction to the storage device target using the host bus adapter driver layer.

It should be understood that the seventh aspect is an apparatus implementation manner corresponding to the method in the first aspect. Feature descriptions in the first aspect or any possible implementation manner of the first aspect are applicable to the seventh aspect or any possible implementation manner of the seventh aspect, and details are not described herein again.

According to an eighth aspect, an embodiment of the present disclosure provides an apparatus for accessing a storage device, where the apparatus is configured to manage access to the storage device by a virtual machine and includes: an acquiring unit, configured to acquire an access instruction, where the access instruction carries virtual address information and an identifier of a virtual channel of the virtual machine, where the virtual channel is used to connect the virtual machine to the apparatus, the virtual machine corresponds to the virtual channel on a one-to-one basis, and the virtual address information is used to indicate a virtual address of a to-be-accessed storage area in the virtual machine; a determining unit, configured to determine a physical address of the to-be-accessed storage area in the storage device according to the virtual address information and the identifier of the virtual channel of the virtual machine that are carried in the access instruction; and a processing unit, configured to perform an operation on the to-be-accessed storage area according to the access instruction and the physical address of the to-be-accessed storage area in the storage device.

With reference to the eighth aspect, in a first possible implementation manner of the eighth aspect, that the determining unit is configured to determine a physical address of the to-be-accessed storage area in the storage device according to the virtual address information and the identifier of the virtual channel of the virtual machine that are carried in the access instruction includes: the determining unit is configured to query a preset second correspondence according to the virtual address information and the identifier of the virtual channel of the virtual machine that are carried in the access instruction, so as to determine the physical address of the to-be-accessed storage area in the storage device, where the preset second correspondence includes a correspondence between an identifier of each virtual channel and a physical address of a storage area allocated to each virtual channel.

With reference to the eighth aspect or any one of the foregoing possible implementation manners of the eighth aspect, in a second possible implementation manner of the eighth aspect, at least one cache queue is configured in the apparatus, and each cache queue corresponds to a respective virtual channel on a one-to-one basis; after acquiring the access instruction, the acquiring unit is further configured to write the access instruction in a second cache queue corresponding to the virtual channel of the virtual machine; and before determining the physical address of the to-be-accessed storage area in the storage device, the determining unit is further configured to fetch the access instruction from the second cache queue corresponding to the virtual channel of the virtual machine.

With reference to the fourth aspect or any one of the foregoing possible implementation manners of the eighth aspect, in a third possible implementation manner of the eighth aspect, if the acquiring unit acquires at least two access instructions from at least two virtual machines, that the determining unit is configured to determine a physical address of the to-be-accessed storage area in the storage device includes: the determining unit is configured to first determine, according to priorities of the at least two virtual machines corresponding to the at least two access instructions and according to priorities, a physical address of a storage area to be accessed by a high-priority virtual machine in the storage device, and then determine a physical address of a storage area to be accessed by a low-priority virtual machine in the storage device.

With reference to the eighth aspect or any one of the foregoing possible implementation manners of the eighth aspect, in a fourth possible implementation manner of the eighth aspect, if the acquiring unit acquires at least two access instructions from at least two virtual machines, that the determining unit is configured to determine a physical address of the to-be-accessed storage area in the storage device includes: the determining unit is configured to first determine, according to a time sequence of acquiring the at least two access instructions by the acquiring unit, a physical address of a to-be-accessed storage area corresponding to an earlier received access instruction in the storage device, and then determine a physical address of a to-be-accessed storage area corresponding to a later received access instruction in the storage device.

With reference to the eighth aspect or any one of the foregoing possible implementation manners of the eighth aspect, in a fifth possible implementation manner of the eighth aspect, after performing the operation on the to-be-accessed storage area according to the access instruction and the physical address of the to-be-accessed storage area in the storage device, the processing unit is further configured to return a feedback message, where the feedback message includes an execution result of the access instruction and the identifier of the virtual channel of the virtual machine.

It should be understood that the eighth aspect is an apparatus implementation manner corresponding to the method in the fourth aspect. Feature descriptions in the fourth aspect or any possible implementation manner of the fourth aspect are applicable to the eighth aspect or any possible implementation manner of the eighth aspect, and details are not described herein again.

According to a ninth aspect, an embodiment of the present disclosure provides a system for accessing a storage device, where the system includes an I/O adapter and a storage device target; the I/O adapter is configured to acquire an access request from a virtual machine, where the access request carries virtual address information of a to-be-accessed storage area, generate an access instruction according to the access request, and send the access instruction to the storage device target, where the access instruction carries the virtual address information and an identifier of a virtual channel of the virtual machine, where the virtual channel is used to connect the virtual machine to the storage device target, and the virtual machine corresponds to the virtual channel on a one-to-one basis; and the storage device target is configured to acquire the access instruction, determine a physical address of the to-be-accessed storage area in the storage device according to the virtual address information and the identifier of the virtual channel that are carried in the access instruction, and perform an operation on the to-be-accessed storage area according to the access instruction and the physical address of the to-be-accessed storage area in the storage device.

With reference to the ninth aspect, in a first possible implementation manner of the ninth aspect, before generating the access instruction according to the access request, the I/O adapter is further configured to query a preset first correspondence according to an identifier of the virtual machine, so as to determine the identifier of the virtual channel, where the preset first correspondence includes a correspondence between an identifier of each virtual machine and an identifier of each virtual channel.

With reference to the ninth aspect or any one of the foregoing possible implementation manners of the ninth aspect, in a second possible implementation manner of the ninth aspect, at least one cache queue is configured in the I/O adapter, and each cache queue corresponds to a respective virtual channel on a one-to-one basis; after acquiring the access request from the virtual machine, the I/O adapter is further configured to write the access request in a first cache queue corresponding to the virtual channel of the virtual machine; and before generating the access instruction according to the access request, the I/O adapter is further configured to fetch the access request from the first cache queue corresponding to the virtual channel of the virtual machine.

With reference to the ninth aspect or any one of the foregoing possible implementation manners of the ninth aspect, in a third possible implementation manner of the ninth aspect, if the I/O adapter acquires at least two access requests from at least two virtual machines, that the I/O adapter is configured to generate an access instruction according to the access request includes: the I/O adapter is configured to first generate, according to priorities of the at least two virtual machines corresponding to the at least two access requests and according to priorities, an access instruction corresponding to a high-priority virtual machine, and then generate an access instruction corresponding to a low-priority virtual machine.

With reference to the ninth aspect or any one of the foregoing possible implementation manners of the ninth aspect, in a fourth possible implementation manner of the ninth aspect, if the I/O adapter acquires at least two access requests from at least two virtual machines, that the I/O adapter is configured to generate an access instruction according to the access request includes: the I/O adapter is configured to first generate, according to a time sequence of acquiring the at least two access requests, an access instruction corresponding to an earlier received access request, and then generate an access instruction corresponding to a later received access request.

With reference to the ninth aspect or any one of the foregoing possible implementation manners of the ninth aspect, in a fifth possible implementation manner of the ninth aspect, after sending the access instruction to the storage device target, the I/O adapter is further configured to acquire a feedback message from the storage device target, where the feedback message includes an execution result of the access instruction and the identifier of the virtual channel of the virtual machine, determine the virtual machine according to the identifier of the virtual channel, and send the execution result of the access instruction to the virtual machine.

With reference to the fourth aspect or any one of the foregoing possible implementation manners of the ninth aspect, in a sixth possible implementation manner of the ninth aspect, that the I/O adapter is configured to acquire an access request from a virtual machine includes: the I/O adapter is configured to receive a first doorbell notification from the virtual machine, and acquire the access request from an I/O shared ring that is shared with the virtual machine, where the access request is write in the I/O shared ring by the virtual machine, and the first doorbell notification is used to indicate arrival of the access request at the I/O shared ring; and that the I/O adapter is configured to send the execution result of the access instruction to the virtual machine includes: the I/O adapter is configured to write the execution result of the access instruction in the I/O shared ring that is shared with the virtual machine, and send a second doorbell notification to the virtual machine, where the second doorbell notification is used to indicate arrival of the execution result at the I/O shared ring.

With reference to the ninth aspect or any one of the foregoing possible implementation manners of the ninth aspect, in a seventh possible implementation manner of the ninth aspect, the access instruction is a small computer system interface (SCSI) instruction that can be processed by a host bus adapter driver layer; and that the I/O adapter is configured to send the access instruction to the storage device target includes: the I/O adapter is configured to send the access instruction to the storage device target using the host bus adapter driver layer.

With reference to the ninth aspect or any one of the foregoing possible implementation manners of the ninth aspect, in an eighth possible implementation manner of the ninth aspect, that the storage device target is configured to determine a physical address of the to-be-accessed storage area in the storage device according to the virtual address information and the identifier of the virtual channel that are carried in the access instruction includes: the storage device target is configured to query a preset second correspondence according to the virtual address information and the identifier of the virtual channel that are carried in the access instruction, so as to determine the physical address of the to-be-accessed storage area in the storage device, where the preset second correspondence includes a correspondence between an identifier of each virtual channel and a physical address of a storage area allocated to each virtual channel.

With reference to the ninth aspect or any one of the foregoing possible implementation manners of the ninth aspect, in a ninth possible implementation manner of the ninth aspect, at least one cache queue is configured in the storage device target, and each cache queue corresponds to a respective virtual channel on a one-to-one basis; after acquiring the access instruction, the storage device target is further configured to write the access instruction in a second cache queue corresponding to the virtual channel of the virtual machine; and before determining the physical address of the to-be-accessed storage area in the storage device, the storage device target is further configured to fetch the access instruction from the second cache queue corresponding to the virtual channel of the virtual machine.

With reference to the ninth aspect or any one of the foregoing possible implementation manners of the ninth aspect, in a tenth possible implementation manner of the ninth aspect, if the storage device target acquires at least two access instructions from at least two virtual machines, that the storage device target is configured to determine a physical address of the to-be-accessed storage area in the storage device includes: the storage device target is configured to first determine, according to priorities of the at least two virtual machines corresponding to the at least two access instructions and according to priorities, a physical address of a storage area to be accessed by a high-priority virtual machine in the storage device, and then determine a physical address of a storage area to be accessed by a low-priority virtual machine in the storage device.

With reference to the ninth aspect or any one of the foregoing possible implementation manners of the ninth aspect, in an eleventh possible implementation manner of the ninth aspect, if the storage device target acquires at least two access instructions from at least two virtual machines, that the storage device target is configured to determine a physical address of the to-be-accessed storage area in the storage device includes: the storage device target is configured to first determine, according to a time sequence of acquiring the at least two access instructions, a physical address of a to-be-accessed storage area corresponding to an earlier received access instruction in the storage device, and then determine a physical address of a to-be-accessed storage area corresponding to a later received access instruction in the storage device.

With reference to the ninth aspect or any one of the foregoing possible implementation manners of the ninth aspect, in a twelfth possible implementation manner of the ninth aspect, after performing the operation on the to-be-accessed storage area according to the access instruction and the physical address of the to-be-accessed storage area in the storage device, the storage device target is further configured to return a feedback message, where the feedback message includes an execution result of the access instruction and the identifier of the virtual channel of the virtual machine.

It should be understood that the ninth aspect is a system implementation manner corresponding to the methods in the first aspect and the fourth aspect. Feature descriptions in the first aspect or any possible implementation manner of the first aspect or the fourth aspect or any possible implementation manner of the fourth aspect are applicable to the ninth aspect or any possible implementation manner of the ninth aspect, and details are not described herein again.

According to the technical solutions disclosed by this application, an I/O adapter is configured between a virtual machine and a storage device, a virtual channel that corresponds to the virtual machine on a one-to-one basis is configured between the I/O adapter and the storage device, and an identifier of the corresponding virtual channel is carried in an access instruction, such that a storage device target can uniquely determine a physical address of a to-be-accessed storage area according to virtual address information and the identifier of the virtual channel of the virtual machine. In this way, direct access to the storage device by the virtual machine is implemented, access to the storage device is simplified, an I/O access process is shortened, and consumption of memory resources and computing resources by software layers is reduced.

BRIEF DESCRIPTION OF DRAWINGS

To describe the technical solutions in the embodiments of the present disclosure more clearly, the following briefly describes the accompanying drawings for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
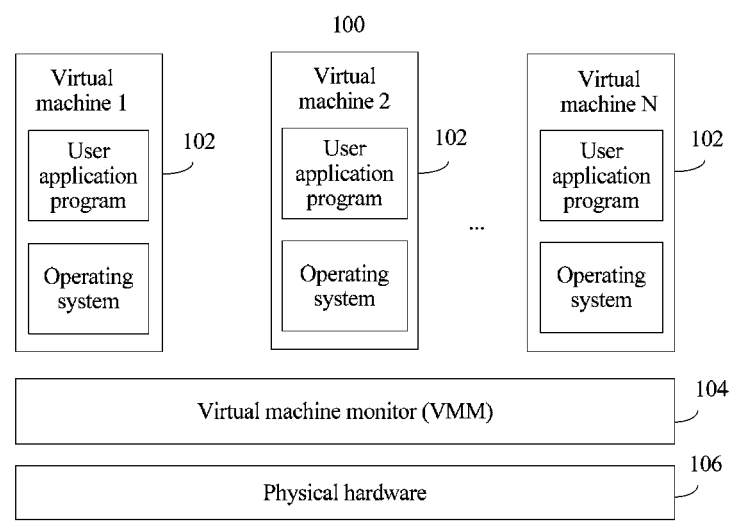
FIG. 1 is a schematic diagram of an architecture of a virtualization system.

FIG. 1 is a schematic structural diagram of a virtualization system 100. As shown in FIG. 1, the system 100 includes physical hardware 106, a virtual machine monitor 104 (VMM), and N virtual machines 102 running on the physical hardware, where N is a positive integer greater than 0.

The virtual machine monitor is a software description layer between an operating system of a virtual machine and the physical hardware. The virtual machine monitor is responsible for processor scheduling, memory allocation, and the like between virtual machines. The VMM not only abstracts hardware of the virtual machines, but also controls running of the virtual machines.

The VMM may be further configured to manage creation, deletion, suspension, resumption, and migration of a virtual machine, processor scheduling, memory allocation, and device access between the virtual machines, and the like.

The VMM provides an abstraction layer for a virtual machine, where the abstraction layer includes an Application Programming Interface (API) for managing virtual hardware. The VMM provides basic virtual hardware such as a virtual central processing unit (VCPU) and a virtual memory management unit (MMU) for the virtual machine, and provides a corresponding hardware interface (secure hardware interface) for the virtual machine, such that device access is performed securely.

The secure hardware interface provides hardware virtualization such as direct memory access (DMA), input/output (I/O), drive, virtual peripheral component interconnect (PCI) address configuration, and virtual hardware interrupt.

The system 100 may support paravirtualization and full-virtualization. On a paravirtualized (PV) virtual machine running on the VMM, an operating system with a modified kernel runs, or an operating system installed with paravirtualized drivers runs. On a fully-virtualized virtual machine running on the VMM, an operating system with an unmodified kernel and not installed with paravirtualized drivers runs.

FIG. 2(a) and FIG. 2(b) are structures of systems 200 (a) and 200 (b) for accessing a storage device according to an embodiment of the present disclosure. As shown in FIG. 2(a) and FIG. 2(b), the system for accessing a storage device according to the embodiment of the present disclosure includes two structures.

Figure 2:
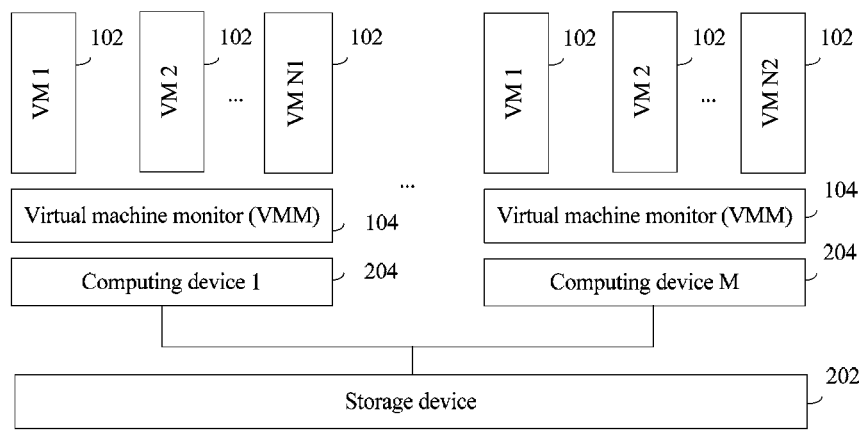
FIG. 2(a) and FIG. 2(b) are a schematic structural diagram of a system for accessing a storage device according to an embodiment of the present disclosure.
Figure 2:
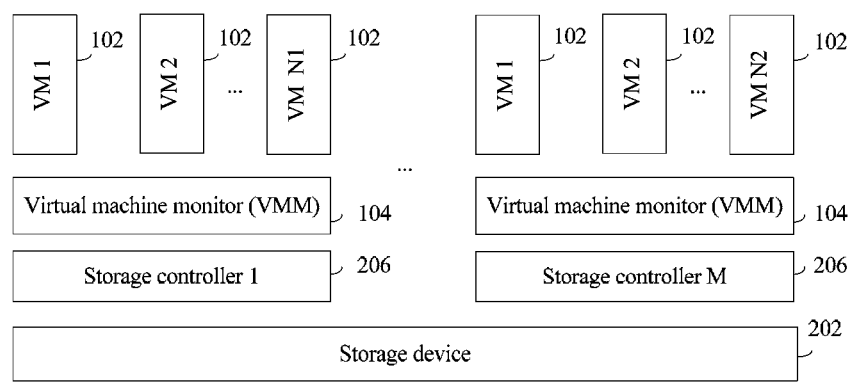

As shown in FIG. 2 (a), the system 200 (a) includes a storage device 202 and M computing devices 204, where a virtualization system 100 shown in FIG. 1 runs on each computing device 204, and M is a positive integer greater than 0.

As shown in the figure, at least one virtual machine runs on each computing device 204. The storage device 202 is shared by virtual machines on the M computing devices 204. The computing devices 204 are separated from the storage device 202. The computing devices 204 may be connected to the storage device 202 using optical fibers, or serial cables, or other connection manners. The connection manner between the storage device 202 and the computing devices 204 is not limited in the embodiment of the present disclosure.

FIG. 2 (a) shows an application scenario of the computing devices 204 and the storage device 202 in a common storage area network (SAN). In this scenario, after a virtual machine running on each computing device 204 generates data, the computing device 204 performs specific processing, and stores valid data in a storage array of the storage device 202.

The storage device 202 includes a storage array. The storage device 202 may be of various types, including but not limited to a random access memory (RAM), a read-only memory (ROM), an electrically erasable programmable read-only memory (EEPROM), a flash memory, other memories, a Compact Disc Read-Only Memory (CD-ROM), a digital versatile disc, another optical storage, a cassette, a magnetic tape, a magnetic disk storage, another magnetic storage device, and any other medium that can be used to store information and can be accessed by the computing device 204. The implementation manner of the storage device 202 is not limited in the embodiment of the present disclosure.

A basic configuration of the computing device 204 generally includes at least one processor and a memory. The memory may be volatile, for example, a random access memory (RAM), or non-volatile, for example, a read-only memory (ROM), a flash memory, or a certain combination thereof.

The basic configuration may have additional features and functions. For example, the basic configuration may include an external storage device (removable or irremovable), including but not limited to a magnetic disk, a magnetic tape, an optical disc, or an optical tape. A computer storage medium includes a volatile or non-volatile, removable or irremovable medium that is used to store information such as a computer-readable instruction, a data structure, a program module, or other data in implementation of any method or technology.

The computing device 204 may further include a communications channel that allows the computing device 204 to communicate with another device. A communications channel medium includes but is not limited to an optical medium, a wired medium such as a wired network or a wired connection, or a wireless medium such as sound, radiofrequency (RF), infrared, or any other wireless medium.

It should be understood that the embodiment of the present disclosure is merely for exemplary description. The computing device 204 may further include another function module, and details are not described herein.

As shown in FIG. 2 (*b*), in another implementation manner of the embodiment of the present disclosure, the system 200 (*b*) for accessing a storage device includes a storage device 202 and M storage controllers 206, where a virtualization system 100 shown in FIG. 1 runs on each storage controller 206, and M is a positive integer greater than 0.

As shown in the figure, at least one virtual machine runs on each storage controller 206. The storage device 202 is shared by virtual machines on the M storage controllers 206. The storage controllers 206 and the storage device 202 constitute an all-in-one machine. In an implementation manner of the embodiment of the present disclosure, a storage controller 206 may hot-swap the storage device 202.

FIG. 2 (*b*) shows an application scenario of the storage device 202 in a SAN with computing devices omitted. In this scenario, a virtual machine directly runs on a storage controller 206 of the storage device 202. The storage controller 206 performs specific processing on data generated by the virtual machine, and stores valid data in a storage array of the storage device 202.

A basic configuration of the storage controller 206 generally includes at least one processor and a memory. The memory may be volatile, for example, a random access memory (RAM), or non-volatile, for example, a read-only memory (ROM), a flash memory, or a certain combination thereof.

The storage controller 206 may further include a communications channel that allows the storage controller 206 to communicate with another device. A communications channel medium includes but is not limited to an optical medium, a wired medium such as a wired network or a wired connection, or a wireless medium such as sound, RF, infrared, or any other wireless medium.

It should be understood that the physical hardware 106 in FIG. 1 may be a specific computer, or may be a storage controller of the storage device 202, or any combination thereof. In addition, the system in FIG. 2(*a*) and FIG. 2(*b*) are a implemented in a variety of forms, where the computing devices 204 may be separated from the storage device 202 and are connected to the storage device 202 in any manner, or the storage controllers 206 and the storage device 202 are integrated in an all-in-one machine. Specific implementation manners of the physical hardware 106 and the system 200 are not limited in the embodiment of the present disclosure. For ease of description, in the following description, the computing device 204, the storage controller 206, or any combination thereof is collectively referred to as a physical machine.

Figure 3:
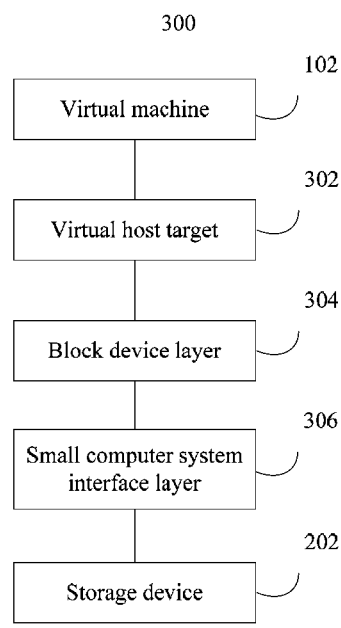
FIG. 3 is a schematic diagram of an architecture for accessing a storage device.

FIG. 3 is a schematic diagram of an architecture for accessing a storage device. As shown in FIG. 3, a kernel-based virtual machine (KVM) is used as an example for description. An entire storage device access process needs to pass through a virtual machine 102, a virtual host target (Vhost target) 302, a block device layer (Block level) 304, a small computer system interface layer (SCSI) 306, and a storage device 202.

In the scenario of 200 (*a*) in FIG. 2(*a*) and FIG. 2(*b*), the access process further needs to pass through a host bus adapter driver (HBA driver) of a computing device 204 and that of the storage device 202. The HBA driver is a SCSI protocol transmission layer (also referred to as an HBA layer) of an operating system on a physical machine. It connects an internal bus of the physical machine to the storage device, and works as a SCSI protocol bearer layer. The HBA driver realizes SCSI protocol, packets and parses SCSI protocol messages, works with the SCSI layer to complete error processing, and is responsible for transmitting a SCSI instruction delivered by the SCSI layer.

The storage array of the storage device 202 may be divided into a plurality of logical unit number (LUN) devices, where each LUN device has a LUN. The LUN devices of the storage device 202 are allocated to a plurality of virtual machines for use, where the plurality of virtual machines may run on a same physical machine or may run on different physical machines, which is not limited in the embodiment of the present disclosure.

Before the entire system runs, first, a LUN device configuration process is performed on the physical machine and the storage device 202, such that a physical drive letter of a LUN device of the storage device 202 is presented at a block device layer of the physical machine. Secondly, a user needs to use a configuration tool to respectively configure physical drive letters on block devices for the plurality of virtual machines running on the physical machine, such that virtual drive letters are presented in the virtual machines. For ease of description, in the embodiment of the present disclosure, a drive letter in a virtual machine is referred to as a virtual drive letter, and a drive letter presented at the block device layer of the physical machine is referred to as a physical drive letter.

When an application layer in the virtual machine 102 needs to access the storage device 202, the virtual machine 102 generates a corresponding BLOCK Input and Output Request (BIO), and then sends the BIO to a block device (in the virtual machine) of the virtual machine. The block device of the virtual machine generates a request according to the BIO, then performs combining, sorting, caching, and scheduling based on requests, and then sends the request to a SCSI layer (in the virtual machine) of the virtual machine using a scheduling algorithm. The SCSI layer of the virtual machine generates a SCSI instruction, and sends the SCSI instruction to a virtual disk driver virtio-scsi. The virtio-scsi generates a virtio_scsi_cmd request according to the SCSI instruction, where the virtio_scsi_cmd request includes data such as a SCSI command descriptor block (CDB), data space description information, and data transmission direction information, and another IO attribute, and the virtio_scsi_cmd carries virtual drive letter information that is provided by the block device layer (Block level) 304 for the virtual machine 102.

The virtual disk driver virtio-scsi of the virtual machine sends the virtio_scsi_cmd request to an I/O shared ring vring of the virtual machine, and notifies the vhost target 302 using a doorbell mechanism that a new I/O request arrives.

After acquiring a notification, the vhost target 302 fetches the virtio_scsi_cmd from the vring, and parses and processes the request. If the request is not a read/write command, simulation processing is directly performed in the vhost target 302. If the request is a read/write command, a corresponding BIO is generated and sent to the designated block device layer 304.

The block device layer 304 generates a request according to the BIO, then performs combining, sorting, caching, and scheduling based on Requsts, and then sends the request to the SCSI layer 306 of the virtual machine using a scheduling algorithm.

The SCSI layer 306 maps a virtual drive letter to a physical drive letter, re-packetizes the request into a SCSI instruction, and sends the SCSI instruction to the storage device 202. The SCSI instruction carries physical drive letter information.

In the scenario of 200 (*a*) shown in FIG. 2(*a*) and FIG. 2(*b*), the SCSI layer sends the SCSI instruction to the storage device 202 using HBA drivers of the computing device 204 and storage device 202. The storage device 202 maps the physical drive letter to a LUN device in the storage array.

In the embodiment in FIG. 3, access to the storage device 202 by the virtual machine 102 is implemented, but multi-layer conversion in the virtual machine 102, the vhost target 302, the block device layer 304, and the SCSI layer 306 is required in the entire access process before the virtual machine 102 can implement access to the storage device 202. In addition, the access request needs to undergo caching, combining, sorting, scheduling, and SCSI instruction conversion in the block device twice, once in the virtual machine, and once in the physical machine.

Figure 4:
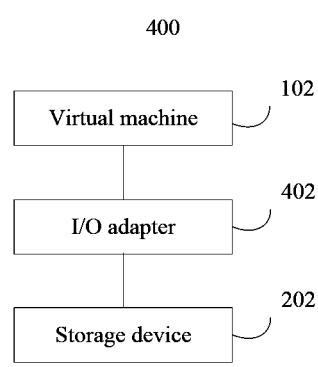
FIG. 4 is a schematic diagram of an architecture for accessing a storage device according to an embodiment of the present disclosure.

FIG. 4 is a schematic diagram of an architecture 400 for accessing a storage device according to an embodiment of the present disclosure. As shown in FIG. 4, the architecture 400 includes a virtual machine 102, an I/O adapter 402, and a storage device 202.

The storage device 202 may be used by a plurality of virtual machines 102 running on a plurality of physical machines. Before the entire system runs, first, a LUN device configuration process is performed on a virtual machine 102 running on a physical machine and the storage device 202, such that a LUN device of the storage device 202 is presented as a virtual LUN device in the virtual machine 102 running on the physical machine. LUN devices of the storage device 202 may be allocated to a plurality of virtual machines for use, where the plurality of virtual machines may run on a physical machine or may run on a plurality of physical machines, which is not limited in the embodiment of the present disclosure.

For ease of description, in the embodiment of the present disclosure, a LUN device in a virtual machine is referred to as a virtual LUN device, and a virtual LUN is used to identify the virtual LUN device; a LUN device in a storage array of the storage device 202 is referred to as a physical LUN device, and a physical LUN is used to identify the physical LUN device.

In a specific implementation process, the I/O adapter 402 may configure a physical LUN device as a virtual LUN device in the virtual machine 102, or a VMM may complete the configuration of a physical LUN device to a virtual LUN device in the virtual machine 102. The configuration of a physical LUN device to a virtual LUN device in the virtual machine may be completed during creation of the virtual machine 102, or the configuration of a physical LUN device to a virtual LUN device may be performed during subsequent dynamic adjustment of resources. The configuration entity and configuration time are not limited in the embodiment of the present disclosure.

In a possible implementation manner of the embodiment of the present disclosure, addressing manners in different virtual machines are the same, and virtual LUN device numbers in different virtual machines may be repeated. The configuration of a physical LUN device to a virtual LUN device may merely be conversion from a physical LUN device number to a virtual LUN device number. Attribute information of the physical LUN device, for example, attribute information about whether to support automatic thin configuration, whether to support continuous cluster reservation, whether to support offloaded data transfer, and whether to support path switching, may be transparently transmitted to the virtual machine. The process of configuring a physical LUN device to a virtual LUN device may be completed by the I/O adapter or the VMM through negotiation with a storage device target, which is not limited in the embodiment of the present disclosure.

Figure 5:
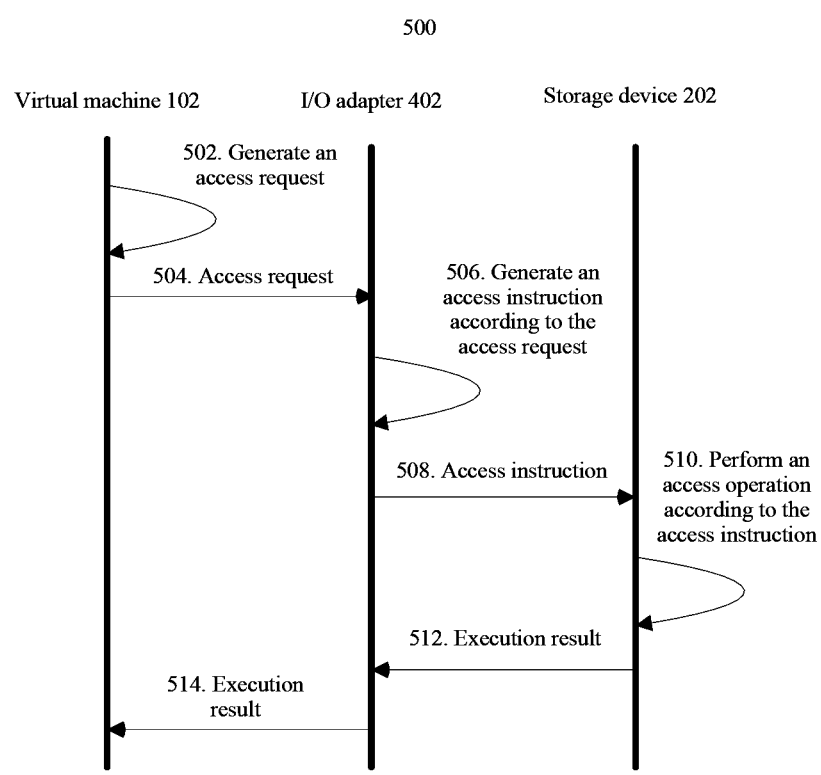
FIG. 5 is a signaling diagram of a method for accessing a storage device according to an embodiment of the present disclosure.

A signaling diagram of a storage device access process in the architecture 400 is shown in FIG. 5. The access process includes:

502. The virtual machine 102 generates a request for accessing the storage device 202.

When the virtual machine 102 receives an upper-layer application requirement and needs to access the storage array in the storage device 202, first, the virtual machine 102 generates an access request, where the access request carries virtual address information of a to-be-accessed storage area.

In an implementation manner of the embodiment of the present disclosure, the access request may carry a virtual LUN of a virtual LUN device to be accessed by the virtual machine 102 and a start address and an address length of the to-be-accessed storage area in the virtual LUN device.

Using KVM virtualization as an example for description, in an implementation manner of the embodiment of the present disclosure, when an application layer in the virtual machine 102 needs to access the storage device 202, the virtual machine 102 generates a corresponding BLOCK Input and Output Request BIO, and then sends the BIO to a block device (in the virtual machine) of the virtual machine 102. The block device of the virtual machine 102 generates a request according to the BIO, then performs combining, sorting, caching, and scheduling based on Requsts, and then sends the request to a SCSI layer (in the virtual machine) of the virtual machine 102 using a scheduling algorithm. The SCSI layer of the virtual machine 102 generates a SCSI instruction according to the request, and sends the SCSI instruction to a virtual disk driver virtio-scsi. The virtio-scsi generates an access request virtio_scsi_cmd according to the SCSI instruction. The access request virtio_scsi_cmd carries the virtual LUN for identifying the virtual LUN device and the start address and the address length of the to-be-accessed storage area in the virtual LUN device.

504. The virtual machine 102 sends the access request to the I/O adapter 402.

The virtual machine 102 puts the access request in an I/O shared ring that is shared with the I/O adapter 402, and sends a first doorbell notification to the I/O adapter, where the first doorbell notification is used to indicate arrival of the access request at the I/O shared ring. After receiving the first doorbell notification from the virtual machine, the I/O adapter 402 acquires the access request from the I/O shared ring that is shared with the virtual machine.

Using KVM virtualization as an example for description, in a specific implementation process, the virtual disk driver virtio-scsi of the virtual machine 102 puts the access request virtio_scsi_cmd in the I/O shared ring vring between the virtual machine 102 and the I/O adapter, notifying the I/O adapter 402 using a doorbell mechanism that a new access request arrives. After receiving the doorbell notification, the I/O adapter 402 fetches the access request virtio_scsi_cmd that is put in the corresponding I/O shared ring by the virtual machine 102.

506. The I/O adapter 402 generates an access instruction according to the access request.

The I/O adapter 402 generates the access instruction according to the access request virtio_scsi_cmd, where the access instruction carries the virtual address information of the to-be-accessed storage area and an identifier of a virtual channel corresponding to the virtual machine 102.

In an implementation manner of the embodiment of the present disclosure, the access instruction may carry the virtual LUN of the virtual LUN device to be accessed by the virtual machine 102, the identifier of the virtual channel corresponding to the virtual machine 102, and the start address and the address length of the to-be-accessed storage area in the virtual LUN device.

The virtual channel is used to connect the virtual machine 102 to the storage device 202, and the virtual machine 102 corresponds to the virtual channel on a one-to-one basis. More specifically, the virtual channel is used to connect the virtual machine 102 to a storage device target of the storage device 202, and the storage device target is configured to manage access to the storage device 202. Because the storage device 202 may be shared by a plurality of virtual machines, and even shared by a plurality of virtual machines running on a plurality of physical machines, to enable the storage device target to identify a virtual machine that is accessing the storage device 202, a correspondence between the virtual machine and the virtual channel needs to be established. The virtual channel between the virtual machine and the storage device target is unique, that is, the virtual machine corresponds to the virtual channel on a one-to-one basis. Therefore, the identifier of the virtual channel can uniquely identify the virtual machine.

It should be understood that the virtual channel and the identifier of the virtual channel are used to represent a unique connection relationship between the virtual machine 102 and the storage device 202. The virtual channel refers to a data transmission channel that is established on a physical medium in a data transmission process using storage and transmission protocols and indicates a unique connection relationship between the virtual machine and the storage device. Each virtual machine is connected to the storage device using a unique virtual channel identified by a virtual channel identifier. In specific implementation, the virtual channel may be implemented in a plurality of forms, for example, may be implemented as a time division multiplexing physical connection channel.

Because virtual machine identifiers of virtual machines running on different physical machines may be repeated, a virtual machine identifier cannot uniquely represent a virtual machine. However, a virtual channel corresponds to a virtual machine on a one-to-one basis, and an essential objective of an identifier of a virtual channel is to uniquely represent a virtual machine connected to the virtual channel. A virtual machine identifier is specifically implemented in a variety of forms, which are not limited in the embodiment of the present disclosure. Any identifier that can uniquely represent an identity of a virtual machine may be used to achieve this objective. A transmission channel between the virtual machine and the storage device, identified by a virtual channel identifier that uniquely represents the identity of the virtual machine, is a unique virtual channel for connecting the virtual machine to the storage device.

The virtual channel may be decided by the I/O adapter 402 through negotiation with the storage device 202, or may be configured in advance. For example, during creation of a virtual machine, a virtual machine monitor (VMM) or a privileged domain for creating the virtual machine configures a virtual channel. The manners of configuring the virtual channel and the identifier of the virtual channel are not limited in the embodiment of the present disclosure. The virtual channel may have various attributes, such as a bearer capability, an address space of the corresponding storage array, and a troubleshooting method.

A one-to-one correspondence between the virtual channel and the virtual machine is maintained in the I/O adapter 402. For example, the one-to-one correspondence between the virtual machine and the virtual channel may be recorded in a form of a data table. In a specific implementation process, a virtual machine identifier may be used to indicate a virtual machine, and a virtual channel identifier is used to indicate a virtual channel.

Before generating the access instruction according to the access request, the I/O adapter 402 queries a preset correspondence, so as to determine the identifier of the virtual channel corresponding to the virtual machine, where the correspondence includes the one-to-one correspondence between the identifier of the virtual channel and the virtual machine.

Configuring virtual channels may allow the storage device target to identify different virtual machines. Because the virtual channel represents a unique connection relationship between the virtual machine and the storage device, even if identifiers of virtual machines running on different physical machines are repeated, the storage device can also distinguish between the virtual machines on different physical machines, and thereby uniquely determine, according to the virtual address information and the identifier of the virtual channel of the virtual machine, a physical address of the storage area to be accessed by the virtual machine.

The one-to-one correspondence between the virtual channel and the virtual machine may be dynamically adjusted. The one-to-one correspondences between the virtual channels and the virtual machines may be adjusted dynamically adjusted. During creation of a virtual machine, a correspondence between the new virtual machine and a virtual channel corresponding to the new virtual machine may be added to the correspondences. During deletion of a virtual machine, a correspondence between the virtual machine and a corresponding virtual channel is also deleted from the correspondences.

In an implementation manner of the embodiment of the present disclosure, the I/O adapter converts the virtio_scsi_cmd instruction into a standard access instruction scsi_cmnd, and uses two high bytes in a LUN address field in the scsi_cmnd to record the identifier of the virtual channel corresponding to the virtual machine 102.

A LUN address generally does not exceed six bytes, but a LUN address field defined in a SCSI model actually includes eight bytes, where two high bytes in the LUN address field are generally reserved. Therefore, the two reserved high bytes in the LUN address field may be used to carry the identifier of the virtual channel to distinguish between different virtual channels.

It should be understood that, in the access instruction, another field or extended field may also be used to carry the identifier of the virtual channel, which is not limited in the embodiment of the present disclosure. For example, if a quantity of virtual channels is less than 256, only one high byte in the LUN address field may be used to record an identifier of a virtual channel.

The following shows some pseudocode of the access request and the access instruction, where two high bytes in the LUN address field are used to record the identifier Virtual_Channel_no of the virtual channel. In specific implementation, the Virtual_Channel_no is left-shifted by 48 bits (that is, 6 bytes), and undergoes a "bitwise OR" operation with a LUN. Because the two high bytes of the LUN address field are 0 by default, after the "bitwise OR" operation is performed on the Virtual_Channel_no and the LUN, the identifier Virtual_Channel_no of the virtual channel is recorded in the two high bytes of the LUN address field. Two bytes may be used to distinguish between 65536 virtual channels.

Pseudocode of the access request:

```
struct virtio_scsi_cmd{
    lun[8];
    cdb[32];
    sdb;
    tag;
    ....
}
```

Pseudocode of the access instruction:

```
struct scsi_cmnd{
    Cmnd= cdb[32];
    sdb = sdb;
    lun = lun[8] | Virtual_Channel_no<<48;
    tag=tag;
    ....
}
```

It should be understood that the foregoing pseudocode is merely for exemplary description. In specific implementation, real pseudocode may be different from the foregoing pseudocode, which is not limited in the embodiment of the present disclosure.

In an implementation manner of the embodiment of the present disclosure, at least one cache queue is configured in the I/O adapter 402, where each cache queue is associated with one virtual channel, and each cache queue corresponds to a respective virtual channel on a one-to-one basis; after acquiring the access request from the virtual machine, the I/O adapter 402 further puts the access request in a first cache queue corresponding to the virtual channel of the virtual machine; and before generating the access instruction according to the access request, the I/O adapter 402 fetches the access request from the first cache queue corresponding to the virtual channel of the virtual machine.

If the I/O adapter 402 acquires at least two access requests from at least two virtual machines, the I/O adapter 402 may first generate, according to priorities of the at least two virtual machines corresponding to the at least two access requests and according to priorities, an access instruction corresponding to a high-priority virtual machine, and then generate an access instruction corresponding to a low-priority virtual machine.

If the I/O adapter 402 acquires at least two access requests from at least two virtual machines, the I/O adapter 402 may generate, according to a time sequence of acquiring the at least two access requests, an access instruction corresponding to an earlier received access request, and then generate an access instruction corresponding to a later received access request.

It should be understood that the foregoing manner of separately processing a plurality of received access requests by the I/O adapter 402 according to priorities of virtual machines or according to a sequence of acquiring time is only an example for description. The sequence of processing the received access requests by the I/O adapter 402 is not limited in the embodiment of the present disclosure.

508. The I/O adapter sends the access instruction to the storage device 202.

In a specific implementation process, in the scenario of 200 (a) shown in FIG. 2(a) and FIG. 2(b), the access instruction is a small computer system interface SCSI instruction that can be processed by a host bus adapter driver layer; and the I/O adapter 402 sends the access instruction to the storage device 202 using HBA drivers of the computing device 204 and storage device 202.

Specifically, the I/O adapter 402 sends the access instruction to the storage device target, and the storage device target is configured to manage the access to the storage device 202.

After acquiring the access instruction from the I/O adapter 402, the storage device target determines the physical address of the to-be-accessed storage area in the storage device according to the virtual address information and the identifier of the virtual channel that are carried in the access instruction. Specifically, the storage device target queries a preset second correspondence according to a virtual address of the storage area to be accessed by the virtual machine 102 and the identifier of the virtual channel of the virtual machine 102, so as to determine the physical address of the to-be-accessed storage area in the storage device, where the preset second correspondence includes a correspondence between an identifier of each virtual channel and a physical address of a storage area allocated to each virtual channel.

Table 1 exemplarily shows a mapping relationship between a virtual address of a virtual machine and a physical address of a storage array. As shown in Table 1, a virtual address in each virtual channel is unique, addresses in different virtual channels may be repeated, and the storage device target can uniquely determine the physical address of the to-be-accessed storage area according to the virtual address and the identifier of the virtual channel.

The physical address of the to-be-accessed storage area is determined according to the identifier of the virtual channel and the virtual address jointly. Because the virtual channel corresponding to the virtual machine is unique, even if virtual machine identifiers of virtual machines running on different physical machines are the same, the storage device target still can uniquely determine the physical address according to the identifier of the virtual channel and the virtual address.

As shown in Table 1, even if virtual addresses of virtual channels with virtual channel identifiers 0 and 1 overlap each other, because the virtual channel identifiers of the two virtual channels are different, the storage device target may map "the virtual channel identifier 0+virtual address VA 1" to a physical address PA 1, and map "the virtual channel identifier 1+virtual address VA 1" to a physical address PA 4.

TABLE 1

Address mapping table

| Virtual channel identifier | Virtual address | Physical address |
|---|---|---|
| 0 | VA 1 | PA 1 |
| 0 | VA 2 | PA 2 |
| 0 | VA 3 | PA 3 |
| ... | ... | ... |
| 1 | VA 1 | PA 4 |
| 1 | VA 2 | PA 5 |
| 1 | VA 3 | PA 6 |
| ... | ... | ... |

In a specific implementation process, the virtual address is indication information of the virtual LUN and the to-be-accessed storage area in the virtual LUN device; the physical address is indication information of a physical LUN and the to-be-accessed storage area in a physical LUN device; and the storage device target may map the virtual LUN in the virtual machine 102 to the physical LUN.

In a possible implementation manner of the embodiment of the present disclosure, at least one cache queue is configured in the storage device target, and each cache queue corresponds to a respective virtual channel on a one-to-one basis; after acquiring the access instruction, the storage device target further puts the access instruction in a second cache queue corresponding to the virtual channel of the virtual machine; and before determining the physical address of the to-be-accessed storage area in the storage device, the storage device target fetches the access instruction from the second cache queue corresponding to the virtual channel of the virtual machine.

If the storage device target acquires at least two access instructions from at least two virtual machines, the storage device target may first determine, according to priorities of the at least two virtual machines corresponding to the at least two access instructions and according to priorities, a physical address of a storage area to be accessed by a high-priority virtual machine in the storage device, and then determine a physical address of a storage area to be accessed by a low-priority virtual machine in the storage device.

If the storage device target acquires at least two access instructions from at least two virtual machines, the storage device target may first determine, according to a time sequence of acquiring the at least two access instructions, a physical address of a to-be-accessed storage area corresponding to an earlier received access instruction in the storage device, and then determine a physical address of a to-be-accessed storage area corresponding to a later received access instruction in the storage device.

It should be understood that the foregoing manner of separately processing a plurality of received access instructions by the storage device target according to priorities or according to a sequence of acquiring time is only an example for description. The sequence of processing the received access instructions by the storage device target is not limited in the embodiment of the present disclosure.

510. A storage device target performs access to a to-be-accessed storage area according to a physical address of the storage area to be accessed by the virtual machine and the access instruction.

In a specific implementation process, if the access instruction is a data write instruction, the storage device target writes to-be-written data into the storage area indicated by the physical address; if the access instruction is a data read instruction, the storage device target reads to-be-read data from the storage area indicated by the physical address.

512. The storage device target returns an execution result of the access instruction to the I/O adapter 402.

In an implementation manner of the embodiment of the present disclosure, the storage device target sends a feedback message to the I/O adapter 402, where the feedback message includes the execution result of the access instruction and the identifier of the virtual channel of the virtual machine. The I/O adapter determines the virtual machine according to the identifier of the virtual channel. Optionally, the I/O adapter finds, according to a preset first correspondence and the identifier of the virtual channel, the virtual machine corresponding to the identifier of the virtual channel.

514. The I/O adapter 402 returns the execution result of the access instruction to the virtual machine 102.

In an implementation manner of the embodiment of the present disclosure, the I/O adapter 402 puts the execution result of the access instruction in the I/O shared ring that is shared with the virtual machine 102, and sends a second doorbell notification to the virtual machine 102, where the second doorbell notification is used to indicate arrival of the execution result at the I/O shared ring.

According to the technical solution disclosed by the embodiment of the present disclosure, an I/O adapter is configured between a virtual machine and a storage device, a virtual channel that corresponds to the virtual machine on a one-to-one basis is configured between the I/O adapter and the storage device, and an identifier of the corresponding virtual channel is carried in an access instruction, such that a storage device target can uniquely determine a physical address of a to-be-accessed area according to virtual address information and the identifier of the virtual channel of the virtual machine. In this way, direct access to the storage device by the virtual machine is implemented, access to the storage device is simplified, an I/O access process is shortened, and consumption of memory resources and computing resources by software layers is reduced.

Figure 6:
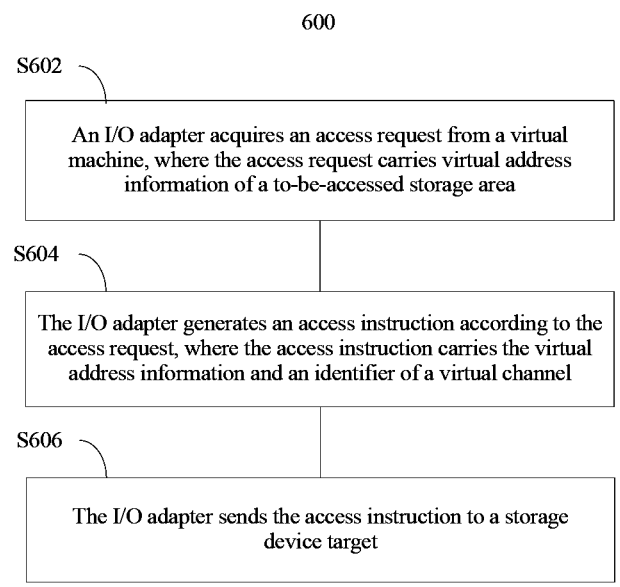
FIG. 6 is an exemplary flowchart of a method for accessing a storage device according to an embodiment of the present disclosure.

FIG. 6 is an exemplary flowchart of a method 600 for accessing a storage device according to an embodiment of the present disclosure. At least one virtual machine runs in a computer system, an I/O adapter is configured in the computer system, and the I/O adapter is configured to manage access to the storage device by a virtual machine running in the computer system. The method 600 includes:

S602. The I/O adapter acquires an access request from the virtual machine, where the access request carries virtual address information of a to-be-accessed storage area.

In a possible implementation manner of the embodiment of the present disclosure, when the virtual machine receives an upper-layer application requirement and needs to access a storage array in the storage device, first, the virtual machine generates an access request, where the access request carries virtual address information of a to-be-accessed storage area.

Using KVM virtualization as an example for description, when an application layer in the virtual machine needs to access the storage device, the virtual machine generates a corresponding BLOCK Input and Output Request BIO, and then sends the BIO to a block device (in the virtual machine) of the virtual machine. The block device of the virtual machine generates a request according to the BIO, then performs combining, sorting, caching, and scheduling based on Requsts, and then sends the request to a SCSI layer (in the virtual machine) of the virtual machine using a scheduling algorithm. The SCSI layer of the virtual machine generates a SCSI instruction according to the request, and sends the SCSI instruction to a virtual disk driver virtio-scsi.

The virtio-scsi generates an access request virtio_scsi_cmd according to the SCSI instruction.

In an implementation manner of the embodiment of the present disclosure, that the I/O adapter acquires an access request from the virtual machine includes: receiving, by the I/O adapter, a first doorbell notification from the virtual machine, and acquiring the access request from an I/O shared ring that is shared with the virtual machine, where the access request is write in the I/O shared ring by the virtual machine, and the first doorbell notification is used to indicate arrival of the access request at the I/O shared ring.

Using KVM virtualization as an example for description, the virtual disk driver virtio-scsi of the virtual machine puts the access request virtio_scsi_cmd in the I/O shared ring vring between the virtual machine and the I/O adapter, and notifies the I/O adapter using a doorbell mechanism that a new access request arrives. After receiving the doorbell notification, the I/O adapter fetches the access request virtio_scsi_cmd that is write in the corresponding I/O shared ring by the virtual machine.

S604. The I/O adapter generates an access instruction according to the access request, where the access instruction carries the virtual address information and an identifier of a virtual channel of the virtual machine, where the virtual channel is used to connect the virtual machine to a storage device target, the virtual machine corresponds to the virtual channel on a one-to-one basis, and the storage device target is configured to manage access to the storage device.

The virtual channel is used to connect the virtual machine to the storage device. Specifically, the virtual channel is used to connect the virtual machine to the storage device target of the storage device. Because the storage device may be shared by a plurality of virtual machines, and even shared by a plurality of virtual machines running on a plurality of physical machines, and identifiers of virtual machines running on different physical machines may be repeated, to enable the storage device target to identify a virtual machine that is accessing the storage device, a correspondence between the virtual machine and the virtual channel needs to be established. The virtual channel between the virtual machine and the storage device target is unique, that is, the virtual machine corresponds to the virtual channel on a one-to-one basis. Therefore, the identifier of the virtual channel can uniquely identify the virtual machine.

Before the I/O adapter generates the access instruction according to the access request, the method further includes: querying, by the I/O adapter, a preset first correspondence according to an identifier of the virtual machine, so as to determine the identifier of the virtual channel, where the preset first correspondence includes a correspondence between an identifier of each virtual machine and an identifier of each virtual channel.

The virtual channel may be decided by the I/O adapter through negotiation with the storage device, or may be configured in advance. For example, during creation of a virtual machine, a virtual machine monitor or a privileged domain for creating the virtual machine configures a virtual channel. The manners of configuring the virtual channel and the identifier of the virtual channel are not limited in the embodiment of the present disclosure.

Using KVM virtualization as an example for description, the I/O adapter generates the access instruction according to the access request virtio_scsi_cmd, where the access instruction carries the virtual address information of the to-be-accessed storage area and the identifier of the virtual channel corresponding to the virtual machine.

In a specific implementation process, a LUN address generally does not exceed six bytes, but a LUN address field defined in a SCSI model actually includes eight bytes, where two high bytes in the LUN address field are generally reserved. Therefore, the two reserved high bytes in the LUN address field may be used to carry the identifier of the virtual channel to distinguish between different virtual channels. It should be understood that, in the access instruction, another field or extended field may also be used to carry the identifier of the virtual channel, which is not limited in the embodiment of the present disclosure. For example, if a quantity of virtual channels is less than 256, only one high byte in the LUN address field may be used to record an identifier of a virtual channel.

In an implementation manner of the embodiment of the present disclosure, the I/O adapter converts the virtio_scsi_cmd instruction into a standard access instruction scsi_cmnd, and uses two high bytes in a LUN address field in the scsi_cmnd to record the identifier of the virtual channel corresponding to the virtual machine.

In an implementation manner of the embodiment of the present disclosure, at least one cache queue is configured in the I/O adapter, where each cache queue corresponds to a respective virtual channel on a one-to-one basis; after the acquiring, by the I/O adapter, an access request from the virtual machine, the method further includes: writing, by the I/O adapter, the access request in a first cache queue corresponding to the virtual channel of the virtual machine; and before the I/O adapter generates the access instruction according to the access request, the method further includes: fetching, by the I/O adapter, the access request from the first cache queue corresponding to the virtual channel of the virtual machine.

Optionally, if the I/O adapter acquires at least two access requests from at least two virtual machines, that the I/O adapter generates an access instruction according to the access request includes: first generating, by the I/O adapter according to priorities of the at least two virtual machines corresponding to the at least two access requests and according to priorities, an access instruction corresponding to a high-priority virtual machine, and then generating an access instruction corresponding to a low-priority virtual machine.

Optionally, if the I/O adapter acquires at least two access requests from at least two virtual machines, that the I/O adapter generates an access instruction according to the access request includes: first generating, by the I/O adapter according to a time sequence of acquiring the at least two access requests, an access instruction corresponding to an earlier received access request, and then generating an access instruction corresponding to a later received access request.

It should be understood that the foregoing manner of separately processing a plurality of received access requests by the I/O adapter according to priorities of virtual machines or according to a sequence of acquiring time is only an example for description. The sequence of processing the received access requests by the I/O adapter is not limited in the embodiment of the present disclosure.

S606. The I/O adapter sends the access instruction to the storage device target.

After the I/O adapter sends the access instruction to the storage device target, the method further includes: acquiring by, the I/O adapter, a feedback message from the storage device target, where the feedback message includes an execution result of the access instruction and the identifier of the virtual channel of the virtual machine; and determining, by the I/O adapter, the virtual machine according to the identifier of the virtual channel, and sending the execution result of the access instruction to the virtual machine.

Specifically, that the I/O adapter sends the execution result of the access instruction to the virtual machine includes: writing, by the I/O adapter, the execution result of the access instruction in the I/O shared ring that is shared with the virtual machine, and sending a second doorbell notification to the virtual machine, where the second doorbell notification is used to indicate arrival of the execution result at the I/O shared ring.

In a specific implementation process, in the scenario of 200 (a) shown in FIG. 2(a) and FIG. 2(b), the access instruction is a small computer system interface SCSI instruction that can be processed by a host bus adapter driver layer; and that the I/O adapter sends the access instruction to the storage device target includes: sending, by the I/O adapter, the access instruction to the storage device target using the host bus adapter driver layer.

It should be understood that the embodiment in FIG. 6 is a method on an I/O adapter side in the embodiment in FIG. 5. Some feature descriptions in the embodiment in FIG. 5 are applicable to the embodiment in FIG. 6, and details are not described herein again.

According to the technical solution disclosed by the embodiment of the present disclosure, an I/O adapter is configured between a virtual machine and a storage device, and a virtual channel corresponding to the virtual machine on a one-to-one basis is configured between the I/O adapter and the storage device. In this way, direct access to the storage device by the virtual machine is implemented, access to the storage device is simplified, an I/O access process is shortened, and consumption of memory resources and computing resources by software layers is reduced.

Figure 7:
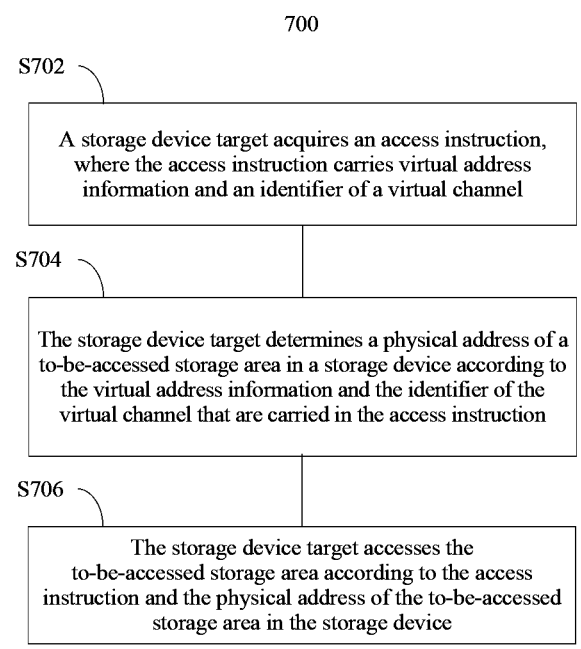
FIG. 7 is an exemplary flowchart of a method for accessing a storage device according to an embodiment of the present disclosure.

FIG. 7 is an exemplary flowchart of a method 700 for accessing a storage device according to an embodiment of the present disclosure. The storage device may be shared by a plurality of virtual machines. The plurality of virtual machines may be virtual machines running on a same physical machine, or may be virtual machines running on different physical machines, and identifiers of virtual machines on different physical machines may be the same. A storage device target is configured to manage access to the storage device. The method 700 includes:

S702. The storage device target acquires an access instruction, where the access instruction carries virtual address information and an identifier of a virtual channel of a virtual machine, where the virtual channel is used to connect the virtual machine to the storage device target, the virtual machine corresponds to the virtual channel on a one-to-one basis, and the virtual address information is used to indicate a virtual address of a to-be-accessed storage area in the virtual machine.

The virtual channel is used to connect the virtual machine to the storage device. Specifically, the virtual channel is used to connect the virtual machine to the storage device target of the storage device. Because the storage device may be shared by a plurality of virtual machines, and even shared by a plurality of virtual machines running on a plurality of physical machines, and identifiers of virtual machines running on different physical machines may be repeated, to enable the storage device target to identify a virtual machine that is accessing the storage device, a correspondence between the virtual machine and the virtual channel needs to be established. The virtual channel between the virtual machine and the storage device target is unique, that is, the virtual machine corresponds to the virtual channel on a one-to-one basis. Therefore, the identifier of the virtual channel can uniquely identify the virtual machine.

The virtual channel may be decided by a virtual machine monitor on a physical machine side or the virtual machine or any other module through negotiation with the storage device, or may be configured in advance. For example, during creation of a virtual machine, a virtual machine monitor or a privileged domain for creating the virtual machine configures a virtual channel. The manners of configuring the virtual channel and the identifier of the virtual channel are not limited in the embodiment of the present disclosure.

In a specific implementation process, a LUN address generally does not exceed six bytes, but a LUN address field defined in a SCSI model actually includes eight bytes, where two high bytes in the LUN address field are generally reserved. Therefore, the two reserved high bytes in the LUN address field may be used to carry the identifier of the virtual channel to distinguish between different virtual channels. It should be understood that, in the access instruction, another field or extended field may also be used to carry the identifier of the virtual channel, which is not limited in the embodiment of the present disclosure. For example, if a quantity of virtual channels is less than 256, only one high byte in the LUN address field may be used to record an identifier of a virtual channel.

S704. The storage device target determines a physical address of the to-be-accessed storage area in the storage device according to the virtual address information and the identifier of the virtual channel that are carried in the access instruction.

In a possible implementation manner of the embodiment of the present disclosure, that the storage device target determines a physical address of the to-be-accessed storage area in the storage device according to the virtual address information and the identifier of the virtual channel that are carried in the access instruction includes: querying, by the storage device target, a preset second correspondence according to the virtual address information and the identifier of the virtual channel that are carried in the access instruction, so as to determine the physical address of the to-be-accessed storage area in the storage device, where the preset second correspondence includes a correspondence between an identifier of each virtual channel and a physical address of a storage area allocated to each virtual channel.

A virtual address in each virtual channel is unique, addresses in different virtual channels may be repeated, and the storage device target can uniquely determine the physical address of the to-be-accessed storage area according to the virtual address and the identifier of the virtual channel. The physical address of the to-be-accessed storage area is determined according to the identifier of the virtual channel and the virtual address jointly. Because the virtual channel corresponding to the virtual machine is unique, even if virtual machine identifiers of virtual machines running on different physical machines are the same, the storage device target still can uniquely determine the physical address according to the identifier of the virtual channel and the virtual address.

In a specific implementation process, the storage device target may map a virtual LUN in the virtual machine to a physical LUN.

In a possible implementation manner of the embodiment of the present disclosure, at least one cache queue is configured in the storage device target, and each cache queue corresponds to a respective virtual channel on a one-to-one basis; after the acquiring, by a storage device target, an access instruction, the method further includes: writing, by the storage device target, the access instruction in a second cache queue corresponding to the virtual channel of the virtual machine; and before the storage device target determines the physical address of the to-be-accessed storage area in the storage device, the method further includes: fetching, by the storage device target, the access instruction from the second cache queue corresponding to the virtual channel of the virtual machine.

Optionally, if the storage device target acquires at least two access instructions from at least two virtual machines, that the storage device target determines a physical address of the to-be-accessed storage area in the storage device includes: first determining, by the storage device target according to priorities of the at least two virtual machines corresponding to the at least two access instructions and according to priorities, a physical address of a storage area to be accessed by a high-priority virtual machine in the storage device, and then determining a physical address of a storage area to be accessed by a low-priority virtual machine in the storage device.

Optionally, if the storage device target acquires at least two access instructions from at least two virtual machines, that the storage device target determines a physical address of the to-be-accessed storage area in the storage device includes: first determining, by the storage device target, according to a time sequence of acquiring the at least two access instructions, a physical address of a to-be-accessed storage area corresponding to an earlier received access instruction in the storage device, and then determining a physical address of a to-be-accessed storage area corresponding to a later received access instruction in the storage device.

It should be understood that the foregoing manner of separately processing a plurality of received access instructions by the storage device target according to priorities or according to a sequence of acquiring time is only an example for description. The sequence of processing the received access instructions by the storage device target is not limited in the embodiment of the present disclosure.

S706. The storage device target performs an operation on the to-be-accessed storage area according to the access instruction and the physical address of the to-be-accessed storage area in the storage device.

In a specific implementation process, if the access instruction is a data write instruction, the storage device target writes to-be-written data into the storage area indicated by the physical address; if the access instruction is a data read instruction, the storage device target reads to-be-read data from the storage area indicated by the physical address.

Optionally, after the storage device target performs the operation on the to-be-accessed storage area according to the access instruction and the physical address of the to-be-accessed storage area in the storage device, the method further includes: returning, by the storage device target, a feedback message, where the feedback message includes an execution result of the access instruction and the identifier of the virtual channel of the virtual machine.

It should be understood that the embodiment in FIG. 7 is a method on a storage device target side in the embodiment in FIG. 5. Some feature descriptions in the embodiment in FIG. 5 are applicable to the embodiment in FIG. 7, and details are not described herein again.

According to the technical solution disclosed by the embodiment of the present disclosure, a virtual channel is established between a virtual machine and a storage device, and an identifier of the corresponding virtual channel is carried in an access instruction, such that a storage device target can uniquely determine a physical address of a to-be-accessed area according to virtual address information and the identifier of the virtual channel of the virtual machine. In this way, direct access to the storage device by the virtual machine is implemented, access to the storage device is simplified, an I/O access process is shortened, and consumption of memory resources and computing resources by software layers is reduced.

Figure 8:
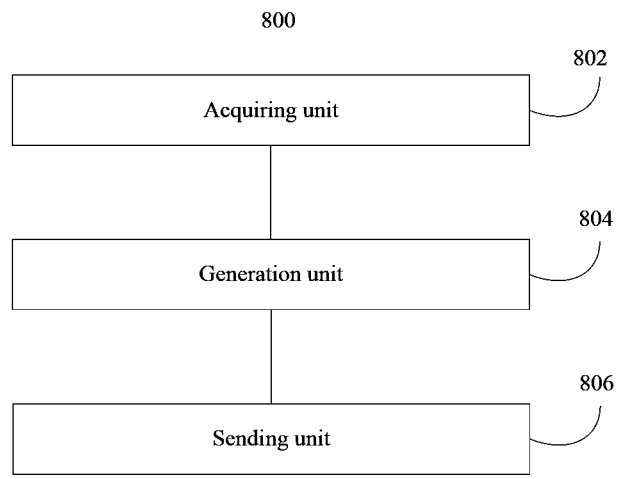
FIG. 8 is a schematic diagram of a logical structure of an apparatus for accessing a storage device according to an embodiment of the present disclosure.

FIG. 8 is a schematic diagram of a logical structure of an apparatus 800 for accessing a storage device according to an embodiment of the present disclosure. The apparatus 800 is configured to manage access to the storage device by a virtual machine running in a computer system. As shown in FIG. 8, the apparatus 800 includes an acquiring unit 802, a generation unit 804, and a sending unit 806.

The acquiring unit 802 is configured to acquire an access request from the virtual machine, where the access request carries virtual address information of a to-be-accessed storage area.

The generation unit 804 is configured to generate an access instruction according to the access request, where the access instruction carries the virtual address information and an identifier of a virtual channel of the virtual machine, where the virtual channel is used to connect the virtual machine to a storage device target, the virtual machine corresponds to the virtual channel on a one-to-one basis, and the storage device target is configured to manage access to the storage device.

The sending unit 806 is configured to send the access instruction to the storage device target.

Specifically, before generating the access instruction according to the access request, the generation unit 804 is further configured to query a preset first correspondence according to an identifier of the virtual machine, so as to determine the identifier of the virtual channel, where the preset first correspondence includes a correspondence between an identifier of each virtual machine and an identifier of each virtual channel.

Optionally, at least one cache queue is configured in the apparatus 800, and each cache queue corresponds to a respective virtual channel on a one-to-one basis; after acquiring the access request from the virtual machine, the acquiring unit 802 is further configured to write the access request in a first cache queue corresponding to the virtual channel of the virtual machine; and before generating the access instruction according to the access request, the generation unit 804 is further configured to fetch the access request from the first cache queue corresponding to the virtual channel of the virtual machine.

Optionally, if the acquiring unit 802 acquires at least two access requests from at least two virtual machines, that the generation unit 804 is configured to generate an access instruction according to the access request includes: the generation unit 804 is configured to first generate, according to priorities of the at least two virtual machines corresponding to the at least two access requests and according to priorities, an access instruction corresponding to a high-priority virtual machine, and then generate an access instruction corresponding to a low-priority virtual machine.

Optionally, if the acquiring unit 802 acquires at least two access requests from at least two virtual machines, that the generation unit 804 is configured to generate an access instruction according to the access request includes: the generation unit 804 is configured to first generate, according to a time sequence of acquiring the at least two access requests, an access instruction corresponding to an earlier received access request, and then generate an access instruction corresponding to a later received access request.

In a possible implementation manner of the embodiment of the present disclosure, after the sending unit 806 sends the access instruction to the storage device target, the acquiring unit 802 is further configured to acquire a feedback message from the storage device target, where the feedback message includes an execution result of the access instruction and the identifier of the virtual channel of the virtual machine; and the sending unit 806 is further configured to determine the virtual machine according to the identifier of the virtual channel, and send the execution result of the access instruction to the virtual machine.

In a possible implementation manner of the embodiment of the present disclosure, that the acquiring unit 802 is configured to acquire an access request from the virtual machine includes: the acquiring unit 802 is configured to receive a first doorbell notification from the virtual machine, and acquire the access request from an I/O shared ring that is shared with the virtual machine, where the access request is write in the I/O shared ring by the virtual machine, and the first doorbell notification is used to indicate arrival of the access request at the I/O shared ring; and that the sending unit 806 is configured to send the execution result of the access instruction to the virtual machine includes: the sending unit 806 is configured to write the execution result of the access instruction in the I/O shared ring that is shared with the virtual machine, and send a second doorbell notification to the virtual machine, where the second doorbell notification is used to indicate arrival of the execution result at the I/O shared ring.

In a specific implementation process, in the scenario of 200 (*a*) shown in FIG. 2(*a*) and FIG. 2(*b*), the access instruction is a small computer system interface (SCSI) instruction that can be processed by a host bus adapter driver layer; and that the sending unit 806 is configured to send the access instruction to the storage device target includes: the sending unit 806 is configured to send the access instruction to the storage device target using the host bus adapter driver layer.

The embodiment of the present disclosure corresponds to the method embodiment in FIG. 6. Some feature descriptions in the embodiments in FIG. 5 and FIG. 6 are applicable to the embodiment of the present disclosure, and details are not described herein again.

Figure 9:
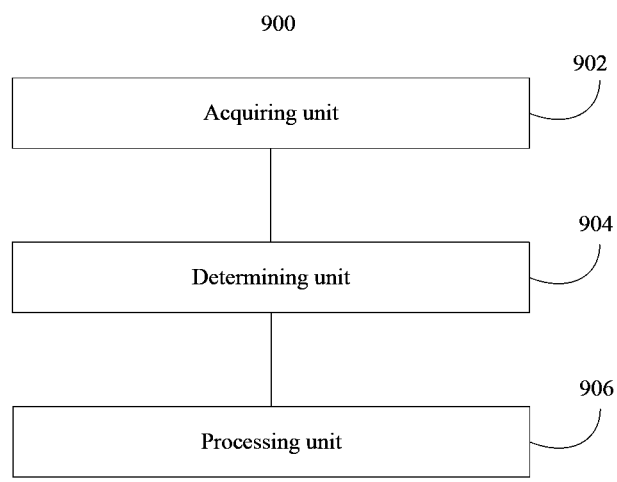
FIG. 9 is a schematic diagram of a logical structure of an apparatus for accessing a storage device according to an embodiment of the present disclosure.

FIG. 9 is a schematic diagram of a logical structure of an apparatus 900 for accessing a storage device according to an embodiment of the present disclosure. The apparatus 900 is configured to manage access to the storage device by a virtual machine. As shown in FIG. 9, the apparatus 900 includes an acquiring unit 902, a determining unit 904, and a processing unit 906.

The acquiring unit 902 is configured to acquire an access instruction, where the access instruction carries virtual address information and an identifier of a virtual channel of the virtual machine, where the virtual channel is used to connect the virtual machine to the apparatus, the virtual machine corresponds to the virtual channel on a one-to-one basis, and the virtual address information is used to indicate a virtual address of a to-be-accessed storage area in the virtual machine.

The determining unit 904 is configured to determine a physical address of the to-be-accessed storage area in the storage device according to the virtual address information and the identifier of the virtual channel that are carried in the access instruction.

The processing unit 906 is configured to perform an operation on the to-be-accessed storage area according to the access instruction and the physical address of the to-be-accessed storage area in the storage device.

Specifically, that the determining unit 904 is configured to determine a physical address of the to-be-accessed storage area in the storage device according to the virtual address information and the identifier of the virtual channel that are carried in the access instruction includes: the determining unit 904 is configured to query a preset second correspondence according to the virtual address information and the identifier of the virtual channel that are carried in the access instruction, so as to determine the physical address of the to-be-accessed storage area in the storage device, where the preset second correspondence includes a correspondence between an identifier of each virtual channel and a physical address of a storage area allocated to each virtual channel.

Optionally, at least one cache queue is configured in the apparatus, and each cache queue corresponds to a respective virtual channel on a one-to-one basis; after acquiring the access instruction, the acquiring unit 902 is further configured to write the access instruction in a second cache queue corresponding to the virtual channel of the virtual machine; and before determining the physical address of the to-be-accessed storage area in the storage device, the determining unit 904 is further configured to fetch the access instruction from the second cache queue corresponding to the virtual channel of the virtual machine.

Optionally, if the acquiring unit 902 acquires at least two access instructions from at least two virtual machines, that the determining unit 904 is configured to determine a physical address of the to-be-accessed storage area in the storage device includes: the determining unit 904 is configured to first determine, according to priorities of the at least two virtual machines corresponding to the at least two access instructions and according to priorities, a physical address of a storage area to be accessed by a high-priority virtual machine in the storage device, and then determine a physical address of a storage area to be accessed by a low-priority virtual machine in the storage device.

Optionally, if the acquiring unit 902 acquires at least two access instructions from at least two virtual machines, that the determining unit 904 is configured to determine a physical address of the to-be-accessed storage area in the storage device includes: the determining unit 904 is configured to first determine, according to a time sequence of acquiring the at least two access instructions by the acquiring unit 902, a physical address of a to-be-accessed storage area corresponding to an earlier received access instruction in the storage device, and then determine a physical address of a to-be-accessed storage area corresponding to a later received access instruction in the storage device.

In an implementation manner of the embodiment of the present disclosure, after performing the operation on the to-be-accessed storage area according to the access instruction and the physical address of the to-be-accessed storage area in the storage device, the processing unit 906 is further configured to return a feedback message, where the feedback message includes an execution result of the access instruction and the identifier of the virtual channel of the virtual machine.

The embodiment of the present disclosure corresponds to the method embodiment in FIG. 7. Some feature descriptions in the embodiments in FIG. 5 and FIG. 7 are applicable to the embodiment of the present disclosure, and details are not described herein again.

Figure 10:
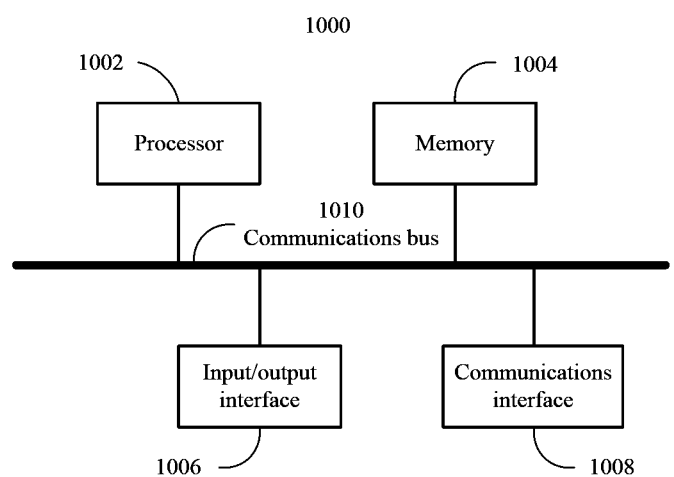
FIG. 10 is a schematic diagram of a hardware structure of an apparatus for accessing a storage device according to an embodiment of the present disclosure.

FIG. 10 is a schematic diagram of a hardware structure of an apparatus 1000 for accessing a storage device according to an embodiment of the present disclosure. As shown in FIG. 10, the apparatus 1000 includes a processor 1002, a memory 1004, an input/output interface 1006, a communications interface 1008, and a bus 1010. The processor 1002, the memory 1004, the input/output interface 1006, and the communications interface 1008 implement a communications connection to each other using the bus 1010.

The processor 1002 may be a general central processing unit (CPU), a microprocessor, an application-specific integrated circuit (ASIC), or one or more integrated circuits, and is configured to execute a related program, so as to implement the technical solution provided in the embodiment of the present disclosure.

The memory 1004 may be a read-only memory, a static storage device, a dynamic storage device, or a random access memory. The memory 1004 may store an operating system and another application program. When the technical solution provided by the embodiment of the present disclosure is implemented by software or firmware, program code for implementing the technical solution provided by the embodiment of the present disclosure is stored in the memory 1004, and executed by the processor 1002.

The input/output interface 1006 is configured to receive input data and information, and to output data such as an operation result.

The communications interface 1008 implements communication between the apparatus 1000 and another device or a communications network using a transceiving apparatus, such as but not limited to a transceiver.

The bus 1010 may include a channel for transmitting information between various components of the apparatus 1000 (for example, the processor 1002, the memory 1004, the input/output interface 1006, and the communications interface 1008).

It should be noted that although only the processor 1002, the memory 1004, the input/output interface 1006, the communications interface 1008, and the bus 1010 are shown in the apparatus 1000 shown in FIG. 10, a person skilled in the art should understand that, in a specific implementation process, the apparatus 1000 further includes other components (e.g., for normal running). In addition, a person skilled in the art should understand that according to specific requirements, the apparatus 1000 may further include a hardware component for implementing another additional function. In addition, a person skilled in the art should understand that an apparatus for implementing the embodiment of the present disclosure may not necessarily include all the components shown in FIG. 10.

The hardware structure shown in FIG. 10 and the foregoing description are applicable to various apparatuses and systems for accessing a storage device according to the embodiments of the present disclosure, and applicable for executing various methods for accessing a storage device according to the embodiments of the present disclosure.

In the several embodiments provided in this application, it should be understood that the disclosed system, device, and method may be implemented in other manners. For example, the described apparatus embodiment is merely for exemplary description. For example, the module division is merely logical function division and may be other division in implementation. For example, a plurality of modules or components may be combined or integrated into another system, or some features may be ignored or not performed. In addition, the displayed or discussed mutual couplings or direct couplings or communication connections may be implemented using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual requirements to achieve the objectives of the solutions of the embodiments.

In addition, function modules in the embodiments of the present disclosure may be integrated into one processing module, or each of the modules may exist alone physically, or two or more modules are integrated into one module. The integrated module may be implemented in a form of hardware, or may be implemented in a form of hardware in addition to a software function module.

When the foregoing integrated module is implemented in a form of a software function module, the integrated module may be stored in a computer-readable storage medium. The software function module is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a removable hard disk, a read-only memory, a random access memory, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present disclosure. Additionally, statements made herein characterizing the invention refer to an embodiment of the invention and not necessarily all embodiments.

What is claimed is:

1. A method for accessing a storage device in a computer system having a virtual machine and an I/O adapter, wherein the method comprises:

acquiring, by the I/O adapter, an access request from the virtual machine, wherein the access request carries virtual address information of a to-be-accessed physical storage area of the storage device;

generating, by the I/O adapter, an access instruction according to the access request, wherein the access instruction carries the virtual address information of the to-be-accessed physical storage area and an identifier of a virtual channel configured between the I/O adapter and the storage device, wherein the virtual channel corresponds to the virtual machine on a one-to-one basis such that the virtual channel provides the virtual machine with a uniquely identifiable transmission channel between the virtual machine, the I/O adapter, and a storage device target, wherein the storage device target is configured to manage access to the storage device; and sending, by the I/O adapter, the access instruction to the storage device target to facilitate the storage device target uniquely determining a physical address of the to-be-accessed physical storage area according to the virtual address information of the to-be-accessed physical storage area and the identifier of the virtual channel that are carried in the access instruction.

2. The method according to claim 1, wherein before generating the access instruction, the method further comprises:
querying, by the I/O adapter, a preset first correspondence according to an identifier of the virtual machine to determine the identifier of the virtual channel, wherein the preset first correspondence comprises a correspondence between an identifier of each virtual machine of a plurality of virtual machines and an identifier of each virtual channel of a plurality of virtual channels.

3. The method according to claim 2, wherein the method further comprises:
maintaining, by the I/O adapter, the one-to-one basis between the virtual channel and the virtual machine by storing an entry comprising the identifier of the virtual channel and the identifier of the virtual machine, and wherein querying the preset first correspondence to determine the identifier of the virtual channel is based on the stored entry indicating the one-to-one basis between the virtual channel and the virtual machine.

4. The method according to claim 1, wherein a plurality of cache queues are configured in the I/O adapter, each cache queue of the plurality of cache queues corresponds to a respective virtual channel of a respective virtual machine based on the one-to-one basis; and
wherein after acquiring the access request, the method further comprises: writing, by the I/O adapter, the access request of the virtual machine in a first cache queue of the plurality of cache queues corresponding to the virtual channel of the virtual machine.

5. The method according to claim 1, wherein if the I/O adapter acquires access requests from at least two virtual machines, an access instruction corresponding to a high-priority virtual machine is generated before an access instruction corresponding to a low-priority virtual machine.

6. The method according to claim 1, wherein the method further comprises:
receiving, by the I/O adapter, a first doorbell notification from the virtual machine indicating arrival of the access request from the virtual machine in an I/O shared ring that is shared between the virtual machine and the I/O adapter, and
wherein acquiring the access request is in response to receiving the first doorbell notification and from the virtual machine via the I/O shared ring.

7. The method according to claim 1, wherein the method further comprises:
in response to determining the virtual machine has been created, creating the one-to-one basis between the virtual channel and the virtual machine; and
storing an entry indicating the one-to-one basis between the virtual channel and the virtual machine in memory of the I/O adapter.

8. The method of according to claim 7, wherein the method further comprises:
dynamically adjusting the entry indicating the one-to-one basis between the virtual channel and the virtual machine by associating the virtual machine with a different virtual channel.

9. The method of claim 7, wherein the method further comprises:
in response to determining the virtual machine has been deleted, deleting the entry indicating the one-to-one basis between the virtual channel and the virtual machine.

10. A method for accessing a storage device, comprising:
acquiring, by a storage device target, an access instruction from an I/O adapter, wherein the access instruction carries virtual address information of a to-be-accessed physical storage area of the storage device and an identifier of a virtual channel configured between the I/O adapter and the storage device, wherein the virtual channel corresponds to the virtual machine on a one-to-one basis such that the virtual channel provides the virtual machine with a uniquely identifiable transmission channel between the virtual machine, the I/O adapter, and the storage device target;
uniquely determining, by the storage device target, a physical address of the to-be-accessed physical storage area according to the virtual address information of the to-be-accessed physical storage area and the identifier of the virtual channel that are carried in the access instruction; and
performing, by the storage device target, an operation on the to-be-accessed physical storage area according to the access instruction and the physical address of the to-be-accessed physical storage area;
wherein the virtual channel is one of a plurality of virtual channels, wherein each virtual channel is associated with a plurality of virtual addresses, wherein the virtual addresses for the virtual channel associated with the virtual machine overlap with the virtual addresses of a second virtual channel associated with another virtual machine such that a respective virtual address of the virtual channel is the same as a respective virtual address of the second virtual channel, and wherein each virtual channel-virtual address pair corresponds to a different, unique physical address.

11. The method according to claim 10, wherein uniquely determining the physical address of the to-be-accessed physical storage area comprises:
querying, by the storage device target, a preset second correspondence according to the virtual address information of the to-be-accessed physical storage area and the identifier of the virtual channel that are carried in the access instruction to uniquely determine the physical address of the to-be-accessed physical storage area, wherein the preset second correspondence comprises a correspondence between an identifier of each virtual channel of a plurality of virtual channels and a respective physical address of a physical storage area allocated to each virtual channel.

12. The method according to claim 10, wherein a plurality of cache queues are configured in the storage device target, each cache queue of the plurality of cache queues corresponds to a respective virtual channel of a respective virtual machine based on the one-to-one basis; and
wherein after acquiring the access instruction, the method further comprises: writing, by the storage device target, the access instruction in a second cache queue of the plurality of cache queues corresponding to the virtual channel of the virtual machine.

13. The method according to claim 10, wherein if the storage device target acquires access instructions from at least two virtual machines, a physical address of a physical storage area to be accessed by a high-priority virtual machine in the storage device is determined before a physical address of a physical storage area to be accessed by a low-priority virtual machine in the storage device.

14. An I/O adapter apparatus for accessing a storage device, comprising:
a non-transitory memory configured to store instructions; and
a processor coupled to the non-transitory memory and configured to execute the instructions to facilitate:
acquiring an access request from a virtual machine, wherein the access request carries virtual address information of a to-be-accessed physical storage area of the storage device;
generating an access instruction according to the access request, wherein the access instruction carries the virtual address information of the to-be-accessed physical storage area and an identifier of a virtual channel configured between the I/O adapter apparatus and the storage device, wherein the virtual channel corresponds to the virtual machine on a one-to-one basis such that the virtual channel provides the virtual machine with a uniquely identifiable transmission channel between the virtual machine, the I/O adapter, and a storage device target, wherein the storage device target is configured to manage access to the storage device; and
sending the access instruction to the storage device target to facilitate the storage device target uniquely determining a physical address of the to-be-accessed physical storage area according to the virtual address information of the to-be-accessed physical storage area and the identifier of the virtual channel that are carried in the access instruction.

15. The I/O adapter apparatus according to claim 14, wherein the processor is further configured to execute the instructions to facilitate:
before generating the access instruction, querying a preset first correspondence according to an identifier of the virtual machine to determine the identifier of the virtual channel, wherein the preset first correspondence comprises a correspondence between an identifier of each virtual machine of a plurality of virtual machines and an identifier of each virtual channel of a plurality of virtual channels.

16. The I/O adapter apparatus according to claim 14, wherein a plurality of cache queues are is-configured in the I/O adapter apparatus, each cache queue of the plurality of cache queues corresponds to a respective virtual channel of a respective virtual machine based on the one-to-one basis; and
wherein the processor is further configured to execute the instructions to facilitate: after acquiring the access request, writing the access request of the virtual machine in a first cache queue of the plurality of cache queues corresponding to the virtual channel of the virtual machine.

17. The I/O adapter apparatus according to claim 14, wherein the processor is further configured to execute the instructions to facilitate: generating an access instruction corresponding to a high-priority virtual machine before generating an access instruction corresponding to a low-priority virtual machine if the I/O adapter apparatus acquires access requests from at least two virtual machines.

18. A storage device target apparatus for accessing a storage device, comprising:
a non-transitory memory configured to store instructions; and
a processor coupled to the non-transitory memory and configured to execute the instructions to facilitate:
acquiring an access instruction from an I/O adapter, wherein the access instruction carries virtual address information of a to-be-accessed physical storage area of the storage device and an identifier of a virtual channel configured between the I/O adapter and the storage device, wherein the virtual channel corresponds to the virtual machine on a one-to-one basis such that the virtual channel provides the virtual machine with a uniquely identifiable transmission channel between the virtual machine, the I/O adapter, and the storage device target apparatus;
uniquely determining a physical address of the to-be-accessed physical storage area according to the virtual address information of the to-be-accessed physical storage area and the identifier of the virtual channel that are carried in the access instruction; and
performing an operation on the to-be-accessed physical storage area according to the access instruction and the physical address of the to-be-accessed physical storage area;
wherein the virtual channel is one of a plurality of virtual channels, wherein each virtual channel is associated with a plurality of virtual addresses, wherein the virtual addresses for the virtual channel associated with the virtual machine overlap with the virtual addresses of a second virtual channel associated with another virtual machine such that a respective virtual address of the virtual channel is the same as a respective virtual address of the second virtual channel, and wherein each virtual channel-virtual address pair corresponds to a different, unique physical address.

19. The apparatus according to claim 18, wherein uniquely determining the physical address of the to-be-accessed physical storage area comprises:
querying a preset second correspondence according to the virtual address information of the to-be-accessed physical storage area and the identifier of the virtual channel that are carried in the access instruction to uniquely determine the physical address of the to-be-accessed physical storage area, wherein the preset second correspondence comprises a correspondence between an identifier of each virtual channel of a plurality of virtual channels and a respective physical address of a physical storage area allocated to each virtual channel.

20. The apparatus according to claim 18, wherein a plurality of cache queues are configured in the apparatus, each cache queue of the plurality of cache queues corresponds to a respective virtual channel of a respective virtual machine based on the one-to-one basis; and
wherein the processor is further configured to execute the instructions to facilitate: after acquiring the access instruction, writing the access instruction in a second cache queue of the plurality of cache queues corresponding to the virtual channel of the virtual machine.

21. The apparatus according to claim 18, wherein the processor is further configured to execute the instructions to facilitate: determining a physical address of a physical storage area to be accessed by a high-priority virtual machine in the storage device before determining a physical address of a physical storage area to be accessed by a low-priority virtual machine in the storage device if the apparatus acquires access instructions from at least two virtual machines.

22. A system, comprising:
an I/O adapter; and a storage device target configured to manage a storage device;

wherein the I/O adapter is configured to:

acquire an access request from a virtual machine, wherein the access request carries virtual address information of a to-be-accessed physical storage area of the storage device;

generate an access instruction according to the access request; and send the access instruction to the storage device target, wherein the access instruction carries the virtual address information of the to-be-accessed physical storage area and an identifier of a virtual channel configured between the I/O adapter and the storage device, wherein the virtual channel corresponds to the virtual machine on a one-to-one basis such that the virtual channel provides the virtual machine with a uniquely identifiable transmission path between the virtual machine, the I/O adapter, and the storage device target; and wherein the storage device target is configured to:

acquire the access instruction;

uniquely determine a physical address of the to-be-accessed physical storage area according to the virtual address information of the to-be-accessed physical storage area and the identifier of the virtual channel that are carried in the access instruction;

perform an operation on the to-be-accessed physical storage area according to the access instruction and the physical address of the to-be-accessed physical storage area; and return an execution result of the access instruction to the I/O adapter by sending a feedback message to the I/O adapter;

wherein the I/O adapter is further configured to return the execution result of the access instruction to the virtual machine.

23. The system according to claim 22, wherein the I/O adapter is further configured to query a preset first correspondence according to an identifier of the virtual machine to determine the identifier of the virtual channel before generating the access instruction, wherein the preset first correspondence comprises a correspondence between an identifier of each virtual machine of a plurality of virtual machines and an identifier of each virtual channel of a plurality of virtual channels.

24. The system according to claim 22, wherein the I/O adapter is configured to generate an access instruction corresponding to a high-priority virtual machine before generating an access instruction corresponding to a low-priority virtual machine if the I/O adapter acquires access requests from at least two virtual machines.

25. The system according to claim 22, wherein the storage device target is configured to query a preset second correspondence according to the virtual address information of the to-be-accessed physical storage area and the identifier of the virtual channel that are carried in the access instruction to uniquely determine the physical address of the to-be-accessed physical storage area, wherein the preset second correspondence comprises a correspondence between an identifier of each virtual channel of a plurality of virtual channels and a respective physical address of a physical storage area allocated to each virtual channel.

* * * * *

UNITED STATES PATENT AND TRADEMARK OFFICE
CERTIFICATE OF CORRECTION

PATENT NO. : 10,713,074 B2  
APPLICATION NO. : 15/666306  
DATED : July 14, 2020  
INVENTOR(S) : Langbo Li It is certified that error appears in the above-identified patent and that said Letters Patent is hereby corrected as shown below:

In the Claims

Claim 16: Column 37, Line 46: "a plurality of cache queues are is-configured" should read -- a plurality of cache queues are configured --.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*